US012555961B2

(12) United States Patent
Tezuka

(10) Patent No.: US 12,555,961 B2
(45) Date of Patent: Feb. 17, 2026

(54) PLUG FOR ELECTRONIC PLUCKED STRING INSTRUMENT AND CABLE PROVIDED WITH THE SAME

(71) Applicant: TRI-SOUND INC., Tokyo (JP)

(72) Inventor: Daiya Tezuka, Tokyo (JP)

(73) Assignee: TRI SOUND INC., Tokyo (JP)

( * ) Notice: Subject to any disclaimer, the term of this patent is extended or adjusted under 35 U.S.C. 154(b) by 482 days.

(21) Appl. No.: 18/032,972

(22) PCT Filed: Oct. 20, 2021

(86) PCT No.: PCT/JP2021/038804
§ 371 (c)(1),
(2) Date: Sep. 16, 2023

(87) PCT Pub. No.: WO2022/085734
PCT Pub. Date: Apr. 28, 2022

(65) Prior Publication Data
US 2025/0343383 A1 Nov. 6, 2025

(30) Foreign Application Priority Data
Oct. 21, 2020 (JP) ................................ 2020-176759

(51) Int. Cl.
*H01R 24/58* (2011.01)
*H01R 13/52* (2006.01)

(52) U.S. Cl.
CPC ........... *H01R 24/58* (2013.01); *H01R 13/521* (2013.01)

(58) Field of Classification Search
CPC ....... H01R 24/58; H01R 24/62; H01R 13/521
See application file for complete search history.

(56) References Cited

U.S. PATENT DOCUMENTS 4,647,135 A * 3/1987 Reinhardt .............. H01R 24/58 439/669
4,938,717 A * 7/1990 Lau ........................ H01R 24/58 439/669

(Continued)

FOREIGN PATENT DOCUMENTS

CN 205724060 U 11/2016
JP S5780091 U 5/1982

(Continued)

*Primary Examiner* — Harshad C Patel
(74) *Attorney, Agent, or Firm* — BACON & THOMAS, PLLC

(57) ABSTRACT

A plug main body has an elastic ring installation portion formed on an outer peripheral surface of a cable attachment portion, and a main body side ring support portion formed to have a larger diameter axially adjacent to a front side of the elastic ring installation portion and regulating movement of the elastic ring installation portion to a front side of an elastic ring. A cover side ring support portion is formed in an inner surface of the plug cover, extends radially inward with regard to an axis of the main terminal portion and comes into contact with a rear side outer surface of the elastic ring. The elastic ring is axially compressed between the main body side ring support portion and the cover side ring support portion, and the front end surface of the plug cover is directly brought into contact with the rear end surface of the flange.

13 Claims, 12 Drawing Sheets

(56) References Cited

U.S. PATENT DOCUMENTS

| | | | | |
|---|---|---|---|---|
| 6,109,963 | A * | 8/2000 | Follingstad | H01R 9/0521<br>439/578 |
| 6,203,370 | B1 | 3/2001 | Lee | |
| 6,568,964 | B2 * | 5/2003 | D'Addario | H01R 13/17<br>439/675 |
| 6,860,760 | B2 * | 3/2005 | Endo | H01R 24/40<br>439/578 |
| 7,264,479 | B1 * | 9/2007 | Lee | H01R 11/30<br>439/39 |
| 7,476,119 | B2 * | 1/2009 | D'Addario | H01R 9/0521<br>439/578 |
| 7,785,133 | B2 * | 8/2010 | Wajcman | H01R 9/0524<br>439/412 |
| 8,449,311 | B2 * | 5/2013 | Montena | H01R 13/639<br>439/265 |
| 2006/0228941 | A1 * | 10/2006 | Abe | H01R 24/58<br>439/552 |
| 2008/0163736 | A1 * | 7/2008 | Demsey | H01R 24/58<br>84/297 R |
| 2011/0039449 | A1 * | 2/2011 | Montena | H01R 9/0524<br>439/585 |
| 2011/0059649 | A1 * | 3/2011 | Montena | H01R 9/05<br>439/580 |
| 2013/0177172 | A1 * | 7/2013 | Dodd | H01R 24/58<br>381/98 |
| 2016/0190753 | A1 * | 6/2016 | DeCola | H01R 13/187<br>439/668 |
| 2016/0372860 | A1 * | 12/2016 | D'Addario | H01R 9/053 |
| 2017/0093098 | A1 * | 3/2017 | Polinski | H01R 24/40 |

FOREIGN PATENT DOCUMENTS

| | | | |
|---|---|---|---|
| JP | 2010287326 | A | 12/2010 |
| JP | 6590357 | B1 | 10/2019 |
| WO | WO 9604696 | A1 | 2/1996 |

* cited by examiner

PLUG FOR ELECTRONIC PLUCKED STRING INSTRUMENT AND CABLE PROVIDED WITH THE SAME

TECHNICAL FIELD

The invention relates to a plug which is used for an electronic plucked string instrument such as an electric guitar, and a cable which is provided with the same.

BACKGROUND ART

An electronic plucked string instrument such as an electric guitar and an electric bass detects a waveform signal of a musical performance sound which is generated by a string vibration, by a pickup buried in a musical instrument main body, sends the waveform signal to an amplifier by a cable which is drawn out of the musical instrument main body to amplify it, and outputs an amplified musical performance sound from a speaker connected to the amplifier. Connection between the musical instrument and the amplifier is achieved by insertion of a plug provided in a cable end to jacks provided in the musical instrument main body and the amplifier, in a case of a general electronic plucked string instrument.

The plug for the electronic plucked string instrument generally has a main terminal portion which is formed into such a shape as to engage with a musical instrument side jack and an amplifier side jack (for example, a shape and a dimension of which are defined in a standard by the name of "phone plug"), and is generally provided with a metal plug main body which is structured such that a flange and a cable attachment portion are sequentially integrated in a rear side thereof, and a plug cover which covers an outer side of the cable attachment portion. A female thread portion is formed in an inner surface of the plug cover and is threadably mounted to a male thread portion of the cable attachment portion, so that the plug cover is attached to the plug main body.

In the meantime, the electronic plucked string instrument as mentioned above is frequently played by a player while being held by hands as is different from a keyboard instrument, and a player may violently swing a musical instrument particularly in a case of a musical performance in a hard rock or heavy-metal rock music. As a result, a load such as an impact force toward a rotation direction and various directions tends to be constantly applied to a plug which connects the cable to the musical instrument and the amplifier, and a screw fastening of the plug cover to the cable attachment portion slacks and tends to generate such a problem that the plug cover is disconnected toward the cable side. If the plug cover is strongly tightened to the cable attachment portion with the use of a tool, the plug cover is hard to slack again. However, the connection between the cable attachment portion and the cable may be disconnected by an intense load applied to the cable during the musical performance. From the point of view of easy restoration thereof, an excessively strong fastening of the plug cover and the cable attachment portion tends to be disliked by a player.

The screwing of the plug cover frequently slacks and may be disconnected. The player habitually gets it back to the cable attachment portion and manually retightens by wrapping the hem of a garment. However, a deep fastening state by the tool can not be of course obtained due to the manual tightening. As a result, the retightening work for the slack plug cover is continuously repeated with the continuous load application to the cable. For the player, the musical performance is interrupted every time when the plug cover slack. Therefore, the fastening structure for the plug cover which is hard to slack without any tool is desired.

For example, in FIG. 9 of patent literature 1, there is disclosed a plug structure in which a female thread of a plug cover is threadably mounted to a male thread in a state in which an elastic ring is fitted to a cable attachment portion side adjacent to a base portion of a plug main body, and the elastic ring is compressed between a front end surface of the plug cover and the base portion. A plug having a similar structure is also disclosed in FIG. 1 of patent literature 2. Further, in FIG. 16 of the patent literature 1, there is disclosed a plug structure in which the elastic ring fitted to a groove adjacent to the base portion of the plug main body is compressed by the female thread of the plug cover, and an outer peripheral surface of the base portion is covered with a leading end portion of the plug cover.

CITATION LIST

Patent Literature

Patent Literature 1: Japanese Patent No. 6590357
Patent Literature 2: U.S. Pat. No. 6,203,370

SUMMARY OF INVENTION

Technical Problem

In the plug structures disclosed in the patent literatures 1 and 2 mentioned above, an axial force contributing to the fastening between the female thread of the plug cover and the male thread of the attachment portion is mainly composed by a return force in an axial direction of the elastic ring which is compression deformed between the flange and the plug cover front end surface or by the female thread. However, an elastic constant of the rubber elastic ring is extremely small in comparison with the metal, and a strong screw fastening force which can sufficiently contribute to the slack prevention of the plug cover can not be expected. Further, in the structure of FIG. 16 of the patent literature 1 mentioned above, no consideration is given to limit the tightening stroke of the screw. Therefore, there is a defect that the elastic ring deforming excessively due to the excessive tightening of the screw bites into a surrounding gap and is bitten.

An object of the present invention is to provide a plug for an electronic plucked string instrument which can generated a sufficient screw fastening force between a plug main body and a plug cover with a manual tightening, and in which a screw fastening state of the plug cover is hard to slack even if an external force is repeatedly applied to a cable.

Solution to Problem

The present invention relates to a plug for an electronic plucked string instrument which is used by being attached to an end of a cable for connecting the cable to a jack of the electronic plucked string instrument or an amplifier. In order to achieve the object mentioned above, the present invention is provided with a plug main body made of metal and including a main terminal portion which is formed into such a shape as to engage with a musical instrument side jack or an amplifier side jack, a flange which is integrated with a rear side of the main terminal portion when defining an insertion side of the main terminal portion to the musical instrument side jack or the amplifier side jack in an axial direction of the main terminal portion as a front end side, and a cable attachment portion which has a smaller diameter than the flange, is integrated with a rear side of the flange and has a male thread portion formed in an outer peripheral surface thereof, and to which the end of the cable is attached, a plug cover which is formed into a tubular shape to which both ends in an axial direction are open, has an inner peripheral surface in which a female thread portion threadably mounted to the male thread portion of the cable attachment portion is formed, covers the cable attachment portion and is made of metal, and an elastic ring which is made of polymer elastic material and is arranged in contact with an inner surface of the plug cover in an outer peripheral edge side thereof and an outer surface of the cable attachment portion in an inner peripheral edge side thereof respectively, wherein an elastic ring installation portion and a main body side ring support portion are formed in the plug main body, the elastic ring installation portion being formed on an outer peripheral surface of the cable attachment portion, the main body ring installation portion being formed with a larger diameter than the elastic ring installation portion in such a manner as to be adjacent to a front side of the elastic ring installation portion in an axial direction, and regulating the movement of the elastic ring installation portion to a front side of the elastic ring, a cover side ring support portion is formed in an inner surface of the plug cover, the cover side ring support portion extending inward in a radial direction with regard to an axis of the main terminal portion and coming into contact with a rear side outer surface of the elastic ring installed to the elastic ring installation portion, the elastic ring is compressed in an axial direction between the main body side ring support portion and the cover side ring support portion, and the front end surface of the plug cover is directly brought into contact with and stopped at the rear end surface of the flange.

In the plug for the electronic plucked string instrument according to the present invention mentioned above, the female thread portion of the plug cover is threadably mounted to the male thread portion of the cable attachment portion in the plug main body, and the front end surface of the plug cover is brought into contact with and stopped at the rear end surface of the flange to be screwed. Thus, the screwing force for the cable attachment portion of the plug cover is received by a metal-to-metal contact between the plug cover and the flange. As a result, a fastening axial force controlled by the metal elastic constant (Young's modulus) is generated between the contacting screw threads. The Young's modulus of the metal is extremely larger than the elastic constant of the elastic polymer material. Therefore, a strong screw fastening state can be formed between the plug cover and the cable attachment portion even by the manual tightening. However, on the assumption of the manual tightening which can not be additionally tightened sufficiently, the screw fastening force mentioned above is rapidly lost even if an amount of rotation is small in a case where the plug cover rotated by the impact force in a reverse direction with respect to the cable attachment portion, thereby causing the slack of the plug cover.

However, in the plug for the electronic plucked string instrument according to the present invention, the elastic ring is disposed between the plug cover and the cable attachment portion, the elastic ring is compressed in the axial direction between the main body side ring support portion and the cover side ring support portion, and the front end surface of the plug cover is brought into contact with and stopped at the rear end surface of the flange. Therefore, the strong screw fastening state caused by the contact and stop between the metals is formed, and the slack of the screw fastening state due to the impact force applied from the external portion is effectively prevented by the following reasons.

The axial force generated by the return force of the compression deforming elastic ring is superimposed on the fastening axial force generated by the regulation of the screw movement of the plug cover caused by the contact and stop mentioned above, so that the stronger screw fastening state is formed.

A friction force blocking the rotation of the plug cover in a stacking direction is generated in the contact surfaces between the elastic ring installation portion, the main body side ring support portion and the cover side ring support portion, and the elastic ring in association with the axial force generated by the return force of the elastic ring.

The impact force applied to the plug cover is absorbed and reduced by the elastic ring.

Therefore, it is possible to achieve the plug for the electronic plucked string instrument in which the sufficient screw fastening force can be generated by the manual tightening between the plug main body and the plug cover, and the screw fastening state of the plug cover is hard to slack even by the repeated application of the external force to the cable.

In the plug for the electronic plucked string instrument according to the present invention, the cover side ring support portion can be formed as a cover side stepped surface in which a diameter of a front end edge side is larger than a diameter of a rear end edge side in the axial direction. The cover side stepped surface can be formed as an inclined surface in which a diameter is reduced little by little toward a rear side in the axial direction. In a case where the cover side stepped surface receiving a compression force of the elastic ring in the axial direction is orthogonal to the axial direction, a component force pressing the elastic ring against the elastic ring installation portion is not generated until the elastic ring collapses in the axial direction and the deformation generated in the direction orthogonal to the axis is constrained by an inner surface of the plug cover or an outer surface of the cable attachment portion. However, if the cover side stepped surface is inclined as mentioned above, the component force pressing the elastic ring against the elastic ring installation portion is necessarily increased without the constraint as mentioned above. Therefore, the friction force generated in the contact surface with the elastic ring installation portion is increased, and the rotation of the plug cover in the stacking direction is more significantly blocked. Further, owing to the incline of the cover side stepped surface, the problem that the elastic ring bites into the narrow gap between the plug cover and the cable attachment portion is hard to be generated, the problem being generated in the vicinity of the elastic ring in the axial direction.

On the assumption that d is a wire diameter of the elastic ring, and Δd is a deformation margin of the elastic ring which is generated in a normal direction of the cover side stepped surface in the cover side ring support portion under a state in which the front end surface of the plug cover is brought into contact with and stopped at the rear end surface of the flange, a value of $\Delta d/d$ is desirably adjusted to be equal to or more than 0.1 and equal to or less than 0.3. When the value of $\Delta d/d$ is less than 0.1 (10%), the elastic ring may not be deformed sufficiently, and an effect of preventing the slack of the plug is insufficient. On the other hand, $\Delta d/d$ goes beyond 0.3 (30%), the deformation margin of the elastic ring becomes too large, and a compression permanent set is excessively generated in the elastic polymer material constructing the elastic ring. As a result, an elastic force suitable for the deformation amount may not be obtained. Further, the problem that the elastic ring bites into the gap between the plug cover and the cable attachment portion tends to occur.

In the plug for the electronic plucked string instrument, a portion positioned closer to the rear side than the male thread portion of the cable attachment portion is frequently formed as a cantilever structure portion in which gaps in a radial direction are continuously formed in a peripheral direction with respect to the inner surface of the plug cover by setting a threadably mount fastening portion to the female thread portion of the plug cover as a base end. In the cantilever structure portion as mentioned above, a rear end side is in a so-called floating state via the gap in a radial direction in the inner side of the plug cover. Therefore, a bending load of a cantilever mode is repeatedly applied to the threadably mount fastening portion in the base end when a tension or torsion load is applied to the attached cable. The bending load generates rattle in the threadably mount fastening portion, and is a main factor for the slack of the plug cap. In the present invention, the elastic ring installation portion and the elastic ring are desirably disposed in the rear end side of the cantilever structure portion in the axial direction. By forming the elastic ring installation portion in the rear end side of the cantilever structure portion and disposing the elastic ring so as to fill the gap mentioned above, a bending displacement in the rear end side of the cantilever structure portion can be suppressed by a deformation resistance of the elastic ring even if the tension or torsion load is applied to the attached cable, an impact load can be reduced by the elastic ring if the impact load is applied, and an effect of suppressing the rattle of the threadably mount fastening portion and the slack of the plug gap can be extremely enhanced.

The cable attachment portion may be provided with a stem portion which is integrally formed adjacent to the rear side of the flange, and an attachment sleeve which is connected to the rear side of the stem portion via a connecting conductor, is formed into a tubular shape having both opened ends in the axial direction and is provided for allowing the cable to be inserted in the axial direction from a rear end side opening thereof. In this case, the male thread portion is formed in an outer peripheral surface of the stem portion, and the female thread portion is formed in the front end portion of the inner surface of the plug cover. The structure mentioned above can be said to follow a structure of a general plug for an electronic plucked string instrument except that the front end surface of the plug cover is directly brought into contact with and stopped at the flange. Further, the elastic ring installation portion and the elastic ring can be disposed in at least any one of the stem portion and the attachment sleeve. Thus, the structure peculiar to the present invention can be reasonably incorporated without widely changing the structure of the general plug for the electronic plucked string instrument.

In this case, the connecting conductor can form the cantilever structure portion mentioned above together with the attachment sleeve. Therefore, from the point of view of improvement of the effect of suppressing the slack of the plug cap, the elastic ring installation portion and the elastic ring can be said to be more desirably disposed at least in the attachment sleeve side. In particular, in a case where the connecting conductor has a smaller axial cross sectional area than the attachment sleeve, a flexural rigidity of the cantilever structure portion becomes smaller at a position of the connecting conductor. In this regard, the bending displacement of the cantilever structure portion becomes larger even in a case where the load applied to the cable is comparatively small, so that the slack of the plug cap tends to be more likely generated. Therefore, in a case of the structure mentioned above, a ripple effect obtained by the disposition of the elastic ring installation portion and the elastic ring in the attachment sleeve side is further significant.

In a case where the elastic ring installation portion is formed in the stem portion, it is necessary to threadably mount the stem portion in which the male thread portion is formed to the female thread portion in the plug cover side. In this regard, an outer diameter of the elastic ring installation portion tends to be restricted by a nominal diameter of the male thread portion. Therefore, there is a problem that it is slightly hard to sufficiently secure a deformation absorption space for the elastic ring which is formed in an outer peripheral edge side of the elastic ring. On the contrary, the attachment sleeve in which the male thread portion is not formed has no background generating the restriction mentioned above, and therefore has an advantage that the deformation absorption space for the elastic ring can be easily secured. In this case, the elastic ring installation portion and the elastic ring can be of course disposed in both of the stem portion and the attachment sleeve. However, the elastic ring in the stem portion side can be omitted by securing the deformation margin of the elastic ring in the attachment sleeve side sufficiently large. More specifically, the slack prevention effect of the plug cover can be achieved without any problem in a case where the elastic ring installation portion and the elastic ring are disposed only in the attachment sleeve. Thus, the elastic ring installation portion and the elastic ring are disposed only in one position, thereby contributing simplification of the structure of the plug for electronic plucked string instrument according to the present invention.

Effect of Invention

The details of the operations and the effects of the present invention have been already described in "SOLUTION TO PROBLEM", and will not be described repeatedly.

DESCRIPTION OF EMBODIMENTS

Figure 1:
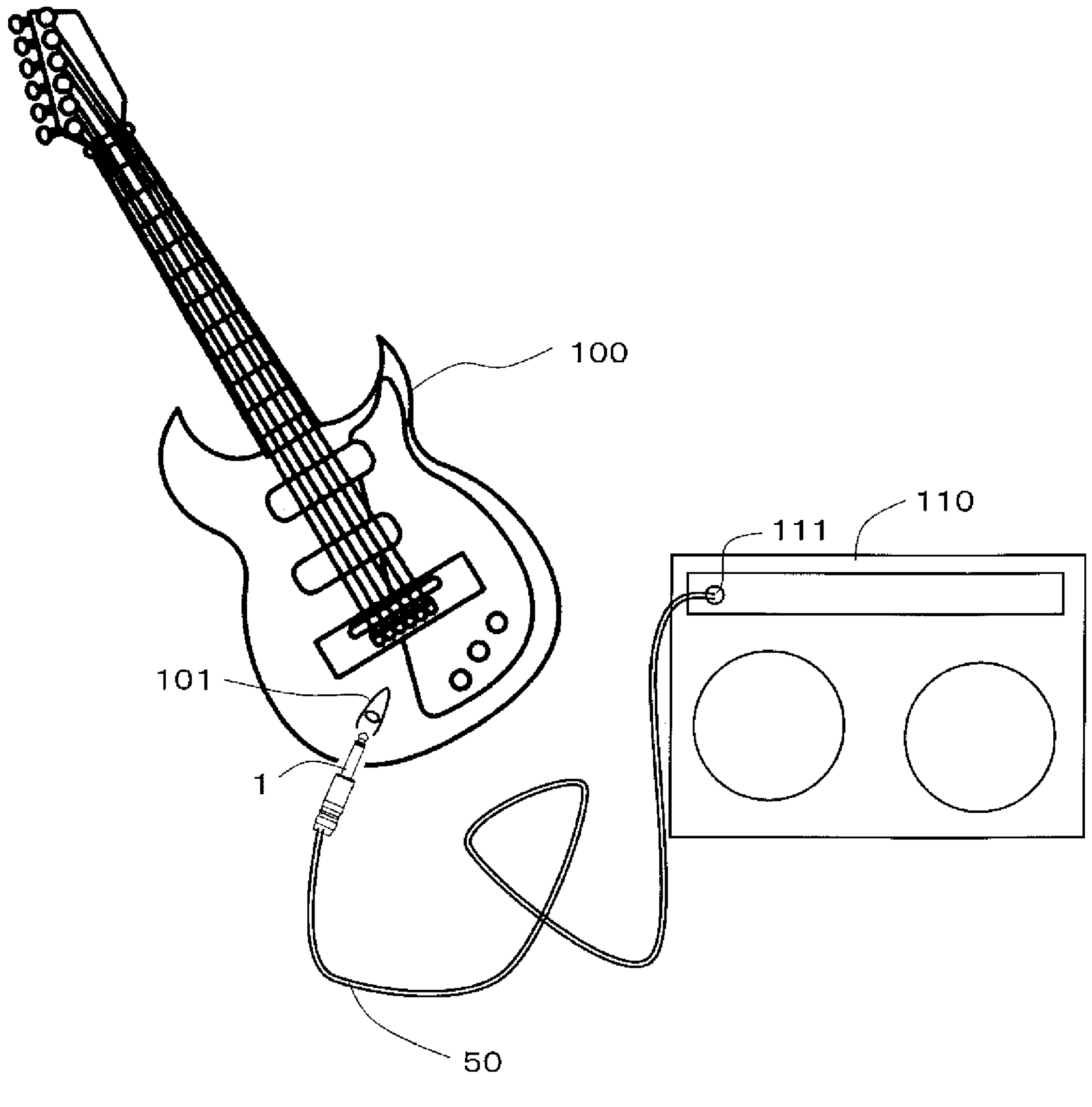
FIG. 1 is a view showing a state in which an electric guitar is connected to an amplifier by a plug for an electronic plucked string instrument according to an embodiment of the present invention.

FIG. 1 shows a state in which an electric guitar 100 corresponding to an electronic plucked string instrument is connected to an amplifier by a plug 1 for an electronic plucked string instrument according to an embodiment of the present invention. The plug 1 for the electronic plucked string instrument is connected to a leading end of a cable 50. A musical instrument side jack 101 forming a music sound output terminal is formed in a lower portion of a front surface (or a lower portion of a side surface) in a body portion of the electric guitar 100, and the cable 50 is connected thereto by inserting the plug 1 into the musical instrument side jack 101. An amplifier side jack 111 is formed in the amplifier 110, and the cable 50 is connected by inserting the plug 1 in the other end into the amplifier side jack 111. The plug 1 can be disposed in both ends of the cable 50. In the following description, a description will be given of an example of the plug 1 which is inserted into the musical instrument side jack 101, however, same applies to a plug 1 which is inserted into the amplifier side jack 111. The electronic plucked string instrument to be applied is not limited to the electric guitar, but may be the other plucked string instrument such as an electric bass and an electric shamisen.

Figure 2:
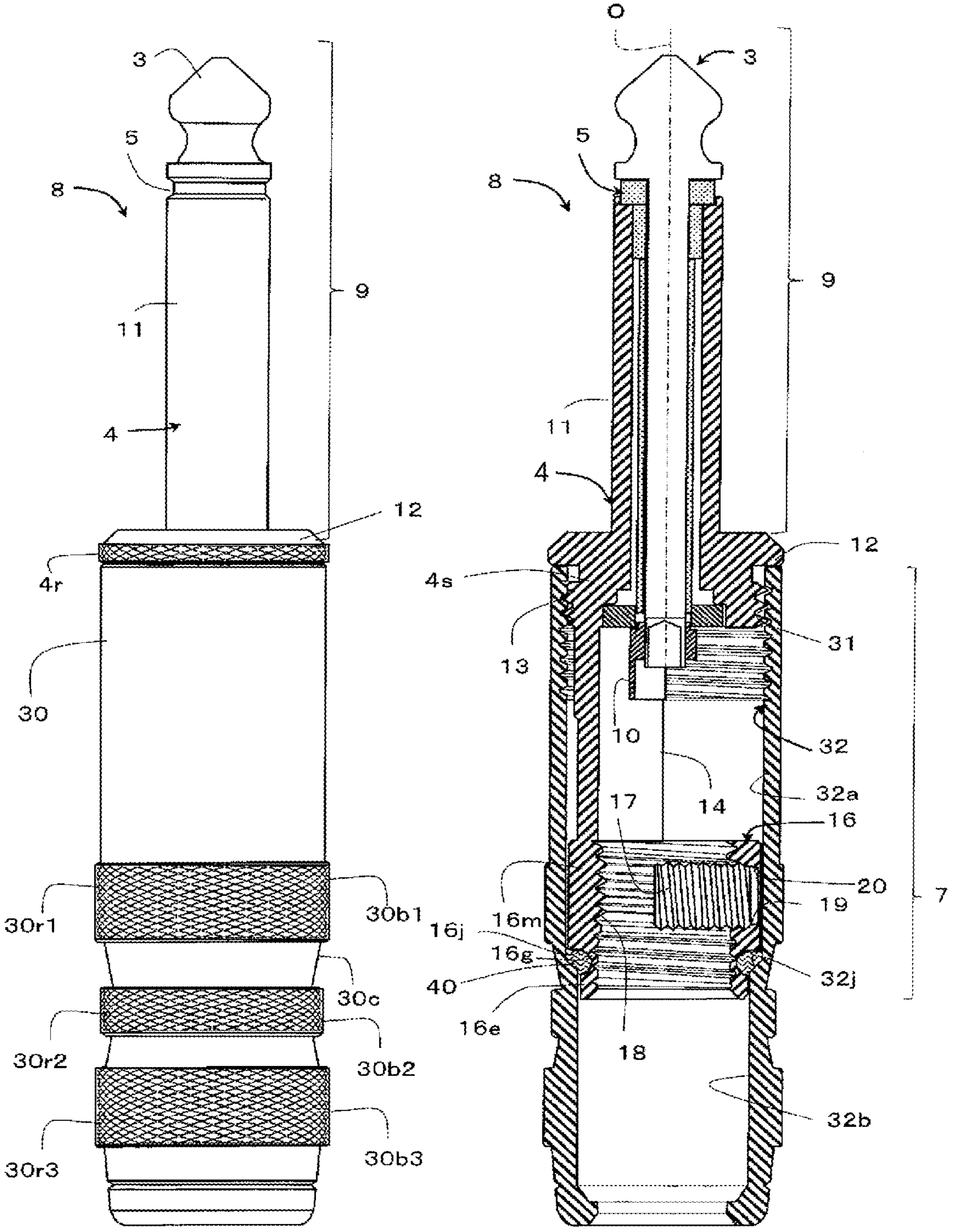
FIG. 2 is a front elevational view and a front elevational cross sectional view showing the plug for the electronic plucked string instrument according to the embodiment of the present invention.

FIG. 2 shows the plug 1 in an enlarged manner. The plug 1 is provided with a plug main body 8 and a plug cover 30 each of which is made of metal, and the plug main body 8 is provided with a main terminal portion 9. The main terminal portion 9 is formed, for example, as a well-known phone plug having a shape defined by JIS: C6560 (1994), and has a shape engaging with the musical instrument side jack 101. In the following description, an insertion side of the main terminal portion 9 into the musical instrument side jack is defined as a front end side in an axial direction (O) of the main terminal portion 9.

The plug main body 8 is provided with a flange 12 which is integrated with a rear side of the main terminal portion 9, and a cable attachment portion 7. The cable attachment portion 7 is integrated with a rear side of the flange 12 so as to have a smaller diameter than the flange 12, and an end of the cable 50 is attached to an outer peripheral surface of the cable attachment portion 7 as well as a male thread portion 13 is formed in the outer peripheral surface. Further, the plug cover 30 is formed into a tubular shape which is open in both ends in an axial direction, a female thread portion 31 threadably mounted to the male thread portion 13 of the cable attachment portion 7 is formed in an inner peripheral surface of the plug cover 30, and the plug cover 30 is adapted to cover the cable attachment portion 7 while allowing the cable 50 to extend out of a rear end side opening. A dimension of each of portions of the plug 1 is not particularly limited, however, for example, a total length thereof is 60 mm, and the main terminal portion 9 has an outer diameter of 6.3 mm and an axial length of 30.5 mm.

An elastic ring 40 is disposed between the cable attachment portion 7 and the plug cover 30. The elastic ring 40 is made of a polymer elastic material (in the present embodiment, natural rubber) such as rubber and elastomer, and is arranged to be in contact with an inner surface of the plug cover 30 in an outer peripheral edge side thereof and in contact with an outer surface of the cable attachment portion 7 in an inner peripheral edge side thereof, respectively.

In the plug main body 8, an elastic ring installation portion **16*g* is formed in an outer peripheral surface of the cable attachment portion 7. Further, a main body side ring support portion 16*j* is formed in such a manner as to be adjacent to a front side of the elastic ring installation portion 16*g* in an axial direction. The main body side ring support portion 16*j* is formed to have a larger diameter than the elastic ring installation portion 16*g* in such a manner as to be adjacent to the front side of the elastic ring installation portion 16*g* in a direction of an axis O, and regulates movement of the elastic ring installation portion 16*g* toward the front side of the elastic ring 40. On the other hand, a cover side ring support portion is formed in an inner surface of the plug cover 30. The cover side ring support portion extends inward in a radial direction with respect to the axis O of the main terminal portion 9 at a position in contact with a rear side outer surface of the elastic ring 40 installed to the elastic ring installation portion 16*g*, and is formed so as to come into contact with the elastic ring 40**.

Figure 3:
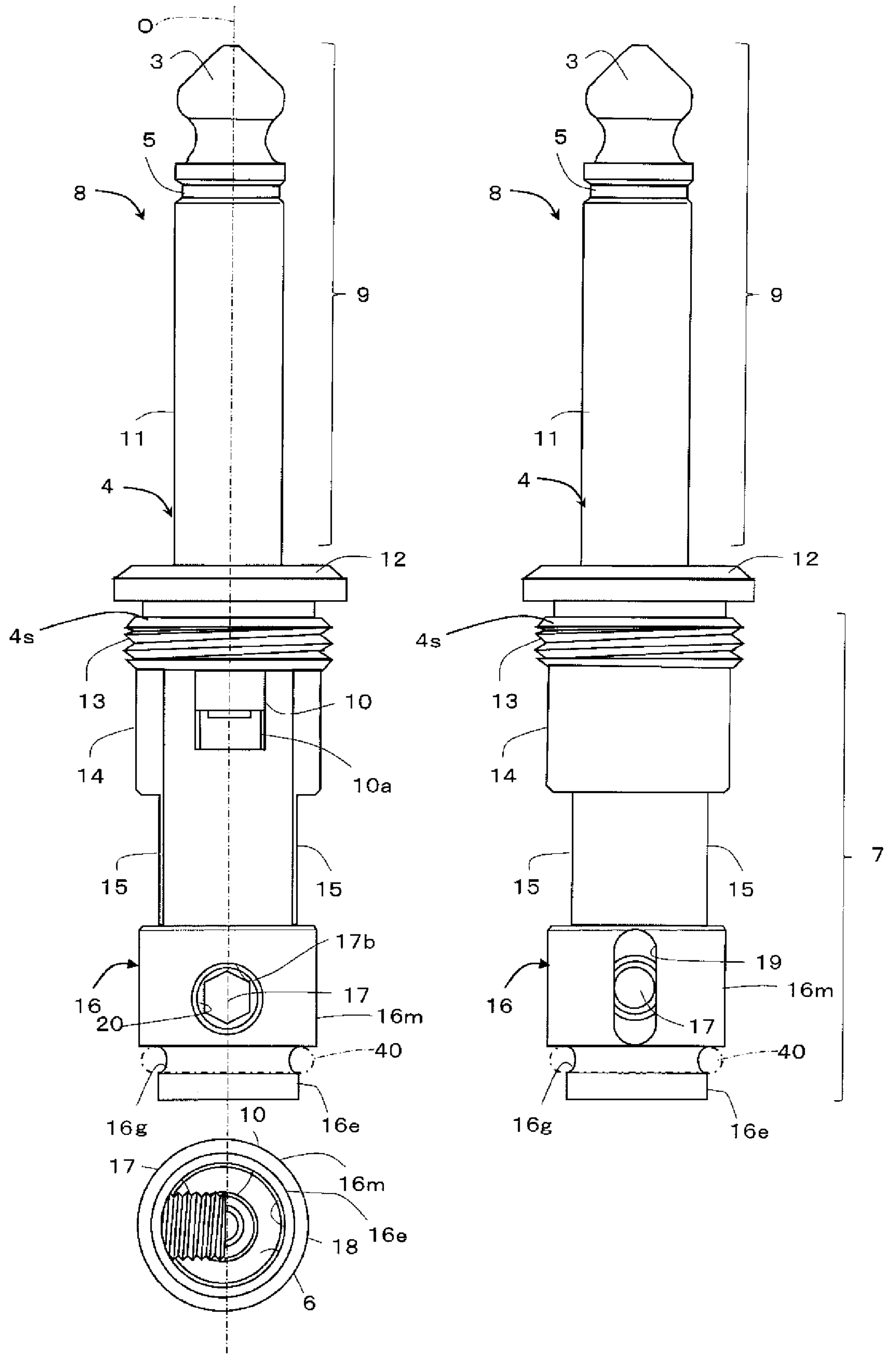
FIG. 3 is a front elevational view, a side elevational view and a bottom elevational view showing a plug main body in the plug for electronic plucked string instrument in FIG. 3.

As shown in FIG. 3, the cable attachment portion 7 is provided with a stem portion **4*s*, a connecting conductor 14 and an attachment sleeve 16. The stem portion 4*s* is integrally formed with a rear side of the flange 12 adjacent thereto. Further, the attachment sleeve 16 is connected to a rear side of the stem portion 4*s* via the connecting conductor 14** and is formed into a tubular shape which is open in both ends in the direction of the axis O.

Figure 4:
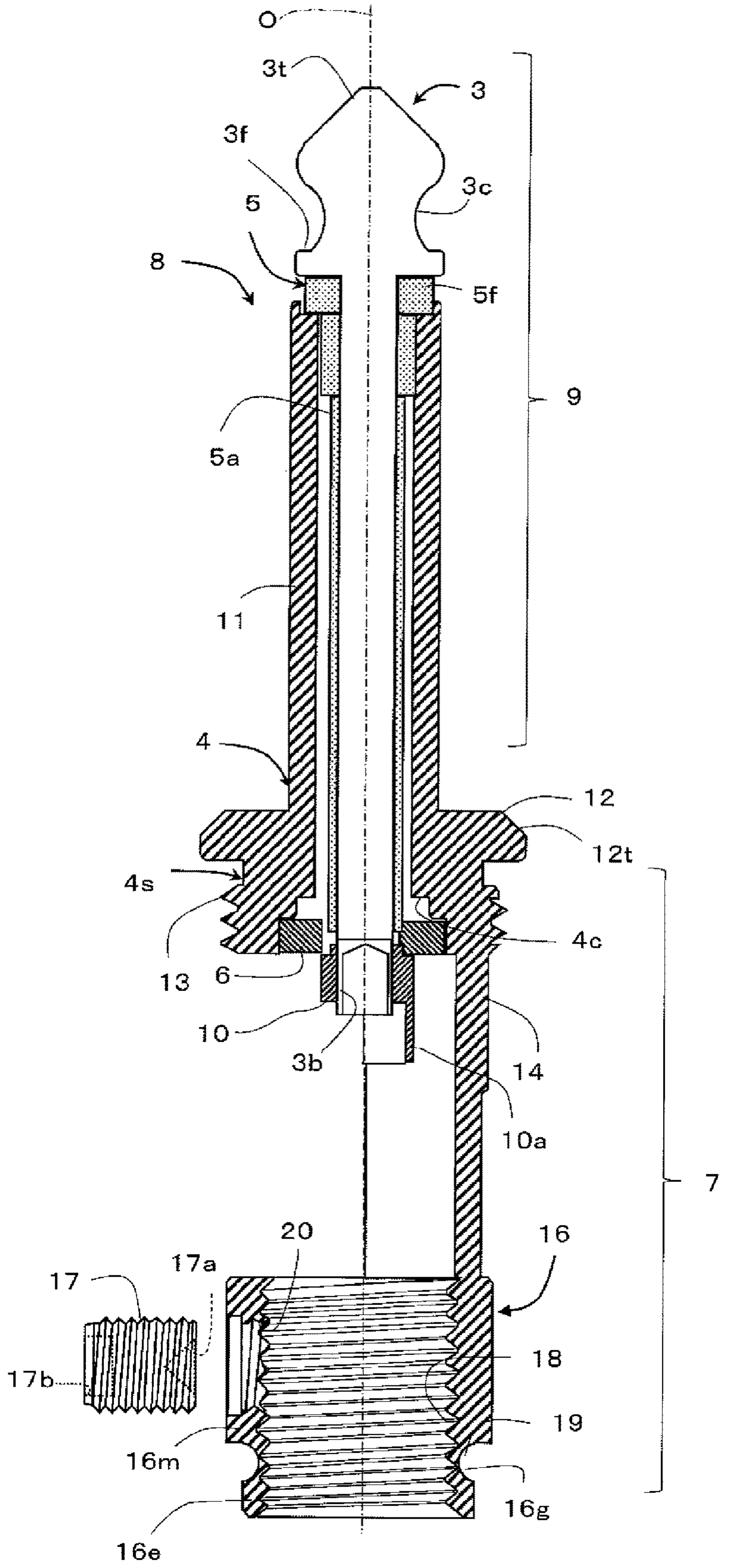
FIG. 4 is a side elevational cross sectional view of the plug main body in FIG. 3.

As shown in FIG. 4, the main terminal portion 9 is constructed by a rod-shaped main metal fitting 3, and a front portion of a grounding metal fitting 4 which is arranged in an outer side of the main metal fitting 3 via a plug side insulation layer 5 (a rear portion of the grounding metal fitting 4 forms the flange 12 and the cable attachment portion 7). A leading end portion **3*t* of the main metal fitting 3 has an engagement concave portion 3*c* engaging with the musical instrument side jack in a side surface thereof, and a terminal flange portion 3*f* is integrally formed in a rear side of the engagement concave portion 3*c* in the direction of the axis O. On the other hand, the grounding metal fitting 4 is formed into a tubular shape, and the main metal fitting 3 is inserted from a rear end thereof in the direction of the axis O from a front end side opening thereof in such a manner as to clamp the tubular plug side insulation layer 5 therebetween. An insulation flange 5***f* formed in a leading end portion of the tubular plug side insulation layer 5 is sandwiched between a rear end surface of the terminal flange portion 3*f* of the main metal fitting 3 and a front end surface of the grounding metal fitting 4. The plug side insulation layer 5 is formed as an injection molded body of a resin having a self-lubricating property, for example, a polyacetal resin.

The materials of the main metal fitting 3 and the grounding metal fitting 4 are constructed specifically by a copper alloy such as brass, phosphor bronze or beryllium copper, and a plating for preventing a corrosion or improving a conductive property is applied to surfaces of the main metal fitting 3 and the grounding metal fitting 4. The plated layer is specifically constructed by a nickel plated layer and a chrome plated layer, and a gold plating may be applied to a top layer portion for further improving an electric conductive property. In the grounding metal fitting 4, the stem portion 4*s*, the connecting conductor 14 and the attachment sleeve 16 are integrally formed by a cutting process of a metal rod member. In order to prevent the set screw 17 from being slacked, a rigidity of the attachment sleeve 16 is preferably higher. In this regard, the grounding metal fitting 4 is desirably constructed by the phosphor bronze of the beryllium copper having a high tensile strength. The beryllium copper has a particularly high strength, and is advantageous in the light of preventing the slack of the set screw 17. Since the beryllium copper is a precipitation hardening type alloy, a necessary rigidity can be secured by applying a precipitation strengthening heat treatment after executing a cutting process in a state of a solution treated material.

The stem portion 4*s* mentioned above is formed in the grounding metal fitting 4 so as to have a larger diameter than the main terminal portion 9. The flange 12 mentioned above is integrated with a front end side of the stem portion 4*s*. Further, a counterbore portion 4*c* is formed in a rear end surface of the stem portion 4*s*, and a rear end portion of the main metal fitting 3 inserted inside protrudes into the counterbore portion 4*c* together with the plug side insulation layer 5, and is fixed by an insulating ring 6 (made of a heat resistant resin, for example, Bakelite) fitted into the counterbore portion 4*c*. Further, a rear end portion of the main metal fitting 3 protrudes out of the insulating ring 6 to a rear side, and a ring-shaped terminal metal fitting 10 is fitted to an outer side thereof in a conduction state. A semi-tubular solder receiving portion 10*a* is integrated with a rear end surface of the terminal metal fitting 10 in a protruding state. Further, a core wire insertion hole 3*b* is formed in an opening manner in a rear end surface of the main metal fitting 3. The connecting conductor 14 is formed into a semi-tubular shape which is open in one side with respect to the axis O of the plug 1, and is notched flat in both sides of an outer side surface in a rear end side (a side to which the attachment sleeve 16 is connected), so that a pair of soldered surfaces 15 and 15 are formed.

Figure 5:
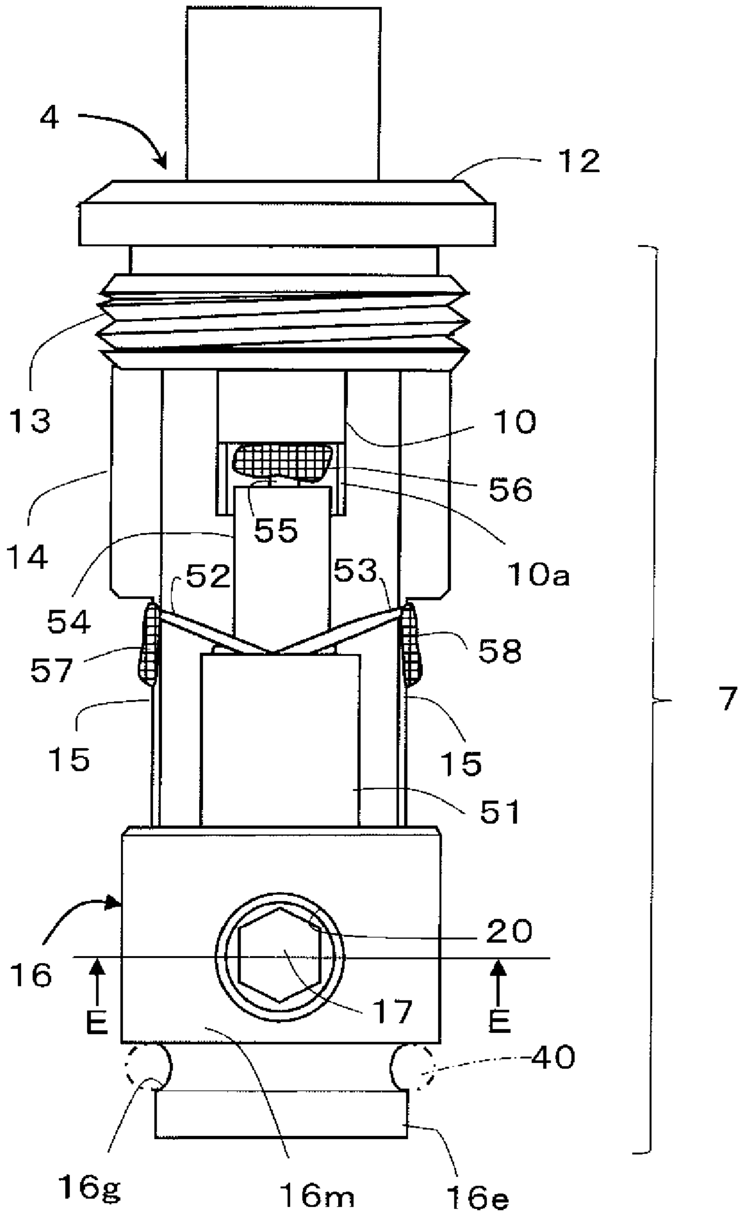
FIG. 5 is an enlarged front elevational view showing a cable attachment portion in FIG. 3 in a state in which a cable is attached thereto.
Figure 6:
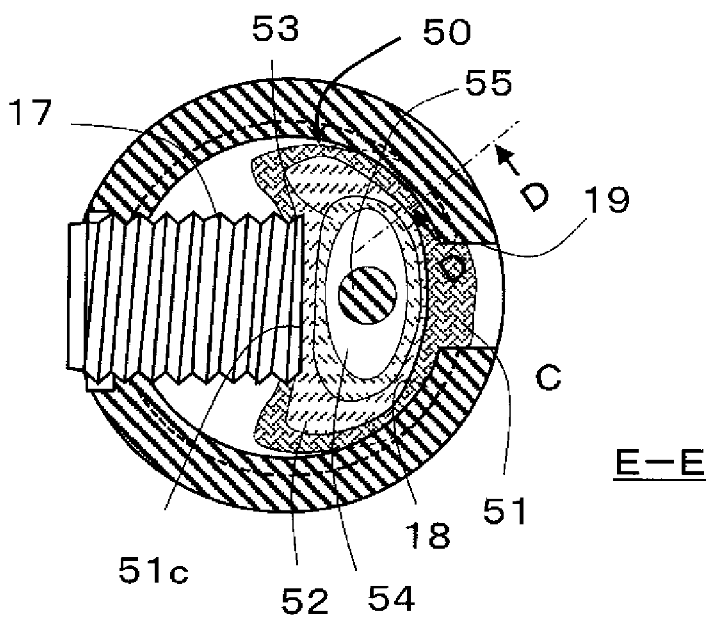
FIG. 6 is a cross sectional view along a line E-E in FIG. 5.

FIG. 5 is an enlarged front elevational view showing the cable attachment portion 7 in FIG. 3 in a state in which the cable 50 is attached thereto, and FIG. 6 is a cross sectional view along a line E-E in FIG. 5. A leading end portion of the cable 50 is inserted into an inner side of the attachment sleeve 16 from a rear end side opening, and is fixed by a set screw 17 as shown in FIG. 6. The set screw 17 passes through a peripheral wall portion of the attachment sleeve 16 in a radial direction and is screwed into the peripheral wall portion so that the leading end surface comes into contact with an insulated outer sheath 51 of the cable 50. The set screw 17 holds the cable 50 in such a manner as to clamp the cable 50 with respect to the peripheral wall portion on the basis of a screwing compression force generated by screwing.

The cable 50 is constructed as a coaxial shielded cable which has shielded conductor layers 52 and 53 in an inner side of an insulated outer sheath 51, and has a core wire 55 arranged in an inner side of the shielded conductor layers 52 and 53 via an intermediate insulation layer 54. In the present embodiment, the shielded conductor layers 52 and 53 are constructed by a first layer 52 and a second layer 53, and are both formed as a winding wire portion in which a conducting wire is wound around an outer side of the intermediate insulation layer 54 in a close contact state. In the first layer 52 and the second layer 53, winding directions of the conducting wires are opposite to each other, and an electrostatic shielding effect applied to the core wire 55 through which the music sound signal current flows is enhanced.

Figure 10:
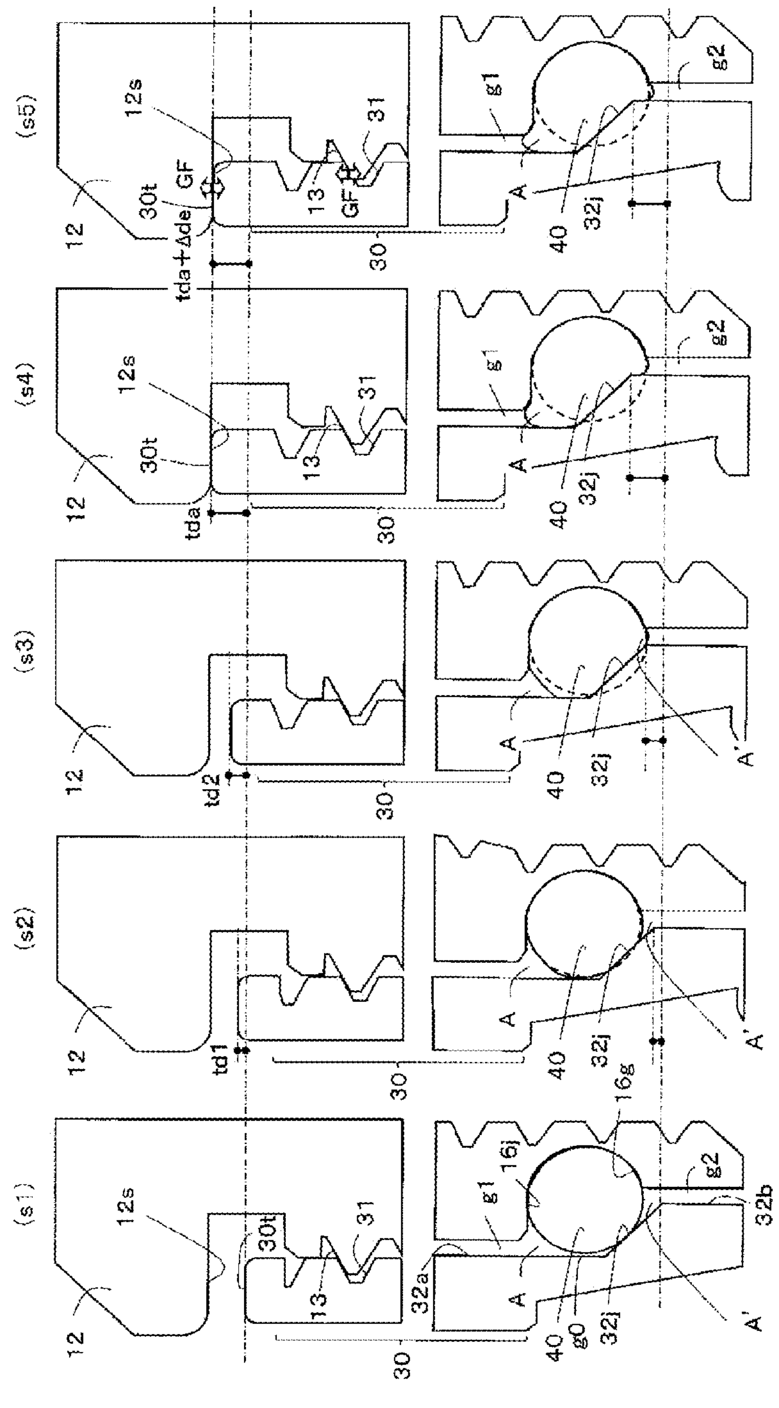
FIG. 10 is an explanatory view showing a process of deformation which is generated in the elastic ring when the plug cover is attached to the plug main body.

In a leading end side of the cable 50, an insulated outer sheath 51 is stripped so that the shielded conductor layers 52 and 53 are exposed, and a leading end portion of the intermediate insulation layer 54 is further stripped in the same manner, so that the core wire 55 is exposed. The core wire 55 is inserted into the core wire insertion hole 3*b* (FIG. 5) in a rear end surface of the main metal fitting 3, and a molten solder is poured into a gap between the leading end surface of the intermediate insulation layer 54 and the rear end surface of the terminal metal fitting 10, so that a soldered portion 56 is formed conductively to couple the core wire 55 and the terminal metal fitting 10. The soldering is executed in a state in which the plug 1 is horizontally put in such a manner that an opening side of the connecting conductor 14 is an upper side, and the solder receiving portion 10*a* plays a role of increasing a soldered surface area as well as preventing the molten solder from falling down. In the meantime, as shown in FIG. 10, the exposed shielded conductor layers 52 and 53 are drawn out in a state in which the leading end portions of the respective winding coils of the first layer 52 and the second layer 53 are allocated to left and right, and are respectively connected to the corresponding soldered surfaces 15 and 15 by soldered portions 57 and 58.

Turning back to FIG. 2, the male thread portion 13 is formed on an outer peripheral surface of the stem portion 4*s*. Further, the female thread portion 31 is formed in a front end portion of an inner surface of the plug cover 30, and the elastic ring installation portion 16*g* and the elastic ring 40 are disposed in the attachment sleeve 16. A rear end portion of the attachment sleeve 16 in the direction of the axis O is formed as a reduced diameter portion 16*e* a diameter of which is reduced by a sleeve side stepped surface, and the sleeve side stepped surface forms the main body side ring support portion 16*j* (hereinafter, refer also to as sleeve side stepped surface 16*j*). Further, an elastic ring insulation portion 16*g* is formed in an outer peripheral surface of the reduced diameter portion 16*e*. The plug cover 30 is fixed to the plug 1 by threadably mounting the female thread portion 31 formed in an inner peripheral surface of a front end portion thereof to the male thread portion 13 in the plug 1 side so that a front end edge thereof is brought into contact with and stopped at the flange 12.

Figure 7:
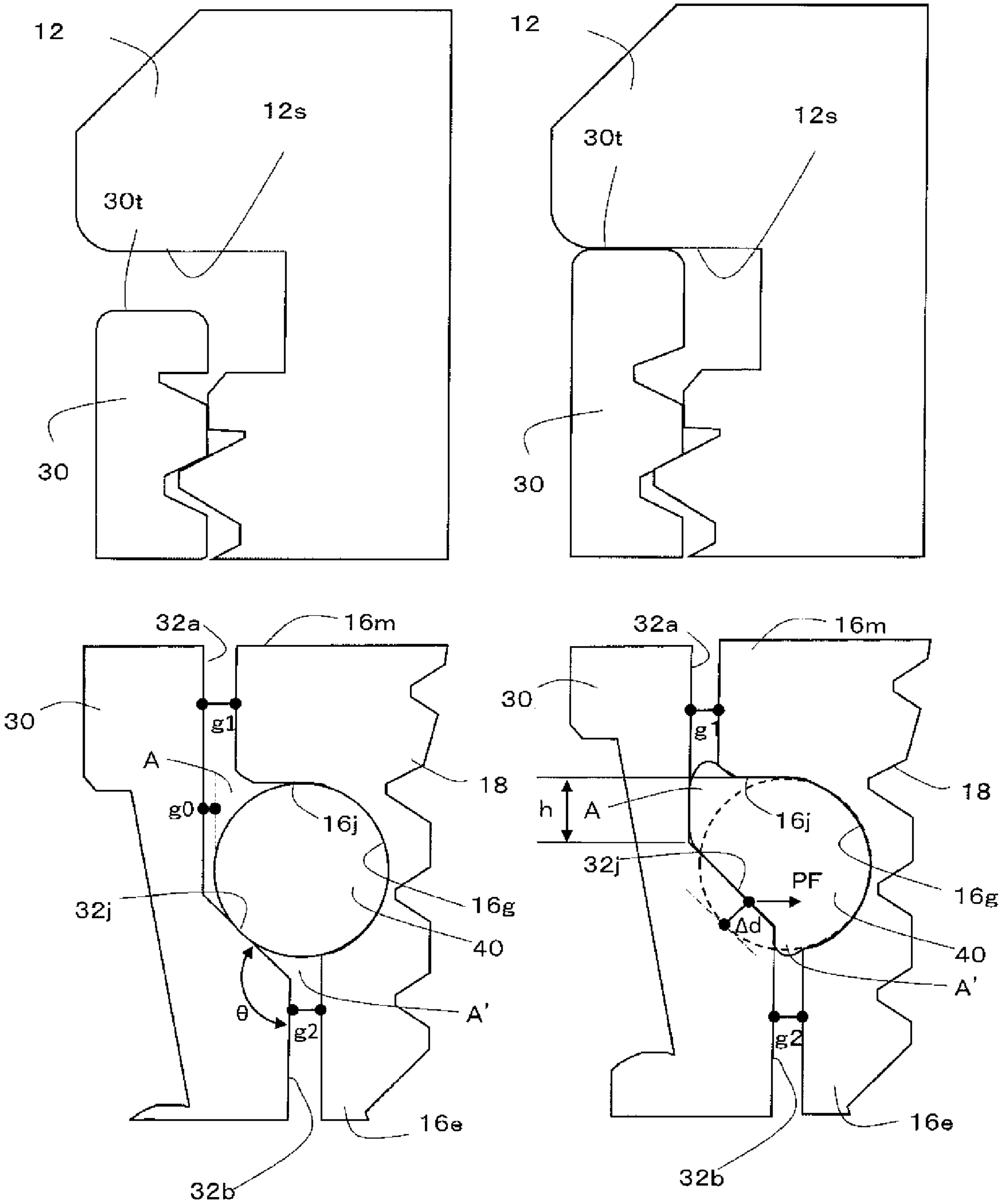
FIG. 7 is an enlarged front elevational cross sectional view showing a periphery of an elastic ring in FIG. 2 by way of two states including a non-compresses state (left) and a compressed state (right) of the elastic ring.

FIG. 7 is an enlarged front elevational cross sectional view showing a periphery of the elastic ring 40 in FIG. 2 by way of two states including a non-compresses state (left) and a compressed state (right: state in which the plug cover 30 is brought into contact with and stopped at the flange 12) of the elastic ring 40. The elastic ring 40 is compressed in the axial direction between the main body side ring support portion 16*j* and the cover side ring support portion, and the front end surface 30*t* of the plug cover 30 is directly brought into contact with and stopped at the rear end surface 12*s* of the flange 12 in this state. The cover side ring support portion is formed as a cover side stepped surface in which a front end edge side in the axial direction has a larger diameter than a rear end edge side (hereinafter, refer also to as cover side stepped surface). The cover side stepped surface is formed as an inclined surface a diameter of which is reduced little by little toward a rear side in the direction of the axis O. The cover side stepped surface is formed as a taper surface shape, however, can be formed as a curved surface shape.

A front side inner peripheral surface 32 and a rear side inner peripheral surface 32*b* of the plug cover 30 are both formed as a cylindrical surface shape, the front side inner peripheral surface 32*a* being connected to a front end edge of the cover side stepped surface, and the rear side inner peripheral surface 32*b* being connected to a rear end edge of the cover side stepped surface. A gap g1 is formed between the main body portion 16*m* of the attachment sleeve 16 and the front side inner peripheral surface 32*a* of the plug cover 30, and a gap g2 is formed between the reduced diameter portion 16*e* and the rear side inner peripheral surface 32*b* of the plug 30, respectively. Dimensions of the gap g1 and the gap g2 are, for example, equal to or more than 0.1 mm and equal to or less than 0.5 mm. Further, in a state in which the plug cover 30 in the right of FIG. 7 is brought into contact with and stopped at the flange 12, a distance h from the sleeve side stepped surface 16*j* to the front end edge of the cover side stepped surface is, for example, equal to or more than 0.3 mm and equal to or less than 0.8 mm (0.5 mm in FIG. 7).

The elastic ring installation portion 16*g* is formed into such a groove shape that an outer peripheral edge of the elastic ring 40 is offset from an inner surface of the plug cover 30 to an inner side in a radial direction by accommodating an inner peripheral edge side of the elastic ring 40. The elastic ring 40 is formed as a so-called O-ring, and an inner edge shape of the elastic ring installation portion 16*g* appearing in a cross section including the axis O in FIG. 2 forms a circular arc shape corresponding to a cross section of the elastic ring 40, as shown in FIG. 7.

An outer diameter of the elastic ring 40 is defined so that a gap g0 is generated with respect to an inner peripheral surface connected to the front edge of the cover side stepped surface of the plug cover 30 in the non-compressed state in the left of FIG. 7. The gap g0 is, for example, equal to or more than 0.05 mm and equal to or less than 0.3 mm (0.1 mm in FIG. 7). Further, the inner diameter of the elastic ring 40 is, for example, equal to or more than 7 mm and equal to or less than 10 mm (8 mm in the present embodiment).

A wire diameter of the elastic ring 40 is defined so that the radially inward compressed state is formed by the inner peripheral surface connected to the front edge of the cover side stepped surface of the plug cover 30 as shown in the right of FIG. 7. The wire diameter of the elastic ring 40 is, for example, equal to or more than 1.0 mm and equal to or less than 2.0 mm (1.5 mm in the present embodiment).

Further, on the assumption that d is the wire diameter d of the elastic ring 40, and Δd is a deformation margin of the elastic ring 40 which is generated in a normal direction of the cover side stepped surface in the cover side ring support portion under a state in which the front end surface of the plug cover 30 is brought into contact with and stopped at the rear end surface of the flange 12, a value of Δd/d (hereinafter, refer to "collapse margin" of the elastic ring 40) is adjusted to be equal to or more than 0.1 and equal to or less than 0.3. In the state shown in the right of FIG. 7, the value of the collapse margin is about 0.2.

A deformation absorption space A is generated in the front side in the axial direction in the outer side of the outer peripheral edge of the elastic ring 40 in such a manner as to be surrounded by the front side inner peripheral surface 32*a* of the plug cover 30, the sleeve side stepped surface 16*j*, the cover side stepped surface 32*j* and the outer surface of the elastic ring 40. Further, a deformation absorption space A' is generated also in the rear side in the axial direction (reduced diameter side of the inclined cover side stepped surface 32*j*) in the outer side of the outer peripheral edge of the elastic ring 40 in such a manner as to be surrounded by the rear side inner peripheral surface 32*b* of the plug cover 30, the outer peripheral surface of the reduced diameter portion 16*e* and the outer surface of the elastic ring 40. The deformation absorption space A is formed so that a volume thereof is larger than that of the deformation absorption space A'. These deformation absorption spaces A and A' function as a deformation absorption space for the elastic ring 40.

Figure 8:
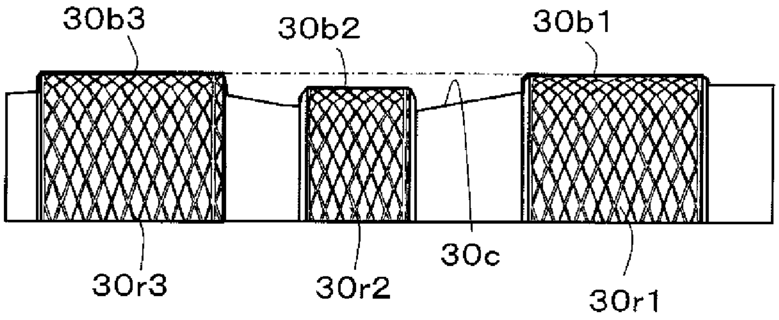
FIG. 8 is an enlarged view of a knurled portion which is formed in a plug cover.

Turning back to FIG. 2, a knurled portion 4*r* and knurled portions 30*r*1 to 30*r*3 are engraved on an outer peripheral surface of the flange 12 of the plug 1 and an outer peripheral surface of the plug cover 30, respectively. FIG. 8 shows the knurled portions 30*r*1 to 30*r*3 of the plug cover 30 in an enlarged manner. A valley portion 30*c* in a peripheral direction is formed at an intermediate position in the axial direction on the outer peripheral surface of the plug cover 30, and a pair of circumferential first ribs 30*b*1 and 30*b*3 are formed in such a manner as to be adjacent to both sides of the valley portion 30*c* in the axial direction. In the meantime, a second rib 30*b*2 is formed at a bottom position of the valley portion 30*c*, a top surface of the second rib 30*b*2 being positioned to be offset in a valley bottom direction (radially inside direction of the plug cover 30) from top surfaces of the first ribs 30*b*1 and 30*b*3.

Since the second rib 30*b*2 is offset from the top surfaces of the first ribs 30*b*1 and 30*b*3, the knurled portions 30*r*1 and 30*r*3 of the first ribs 30*b*1 and 30*b*3 are independently engraved by a first rolling dies (not shown), and the knurled portion 30*r*2 of the second rib 30*b*2 is independently engraved by a second rolling dies (not shown), respectively.

Figure 9:
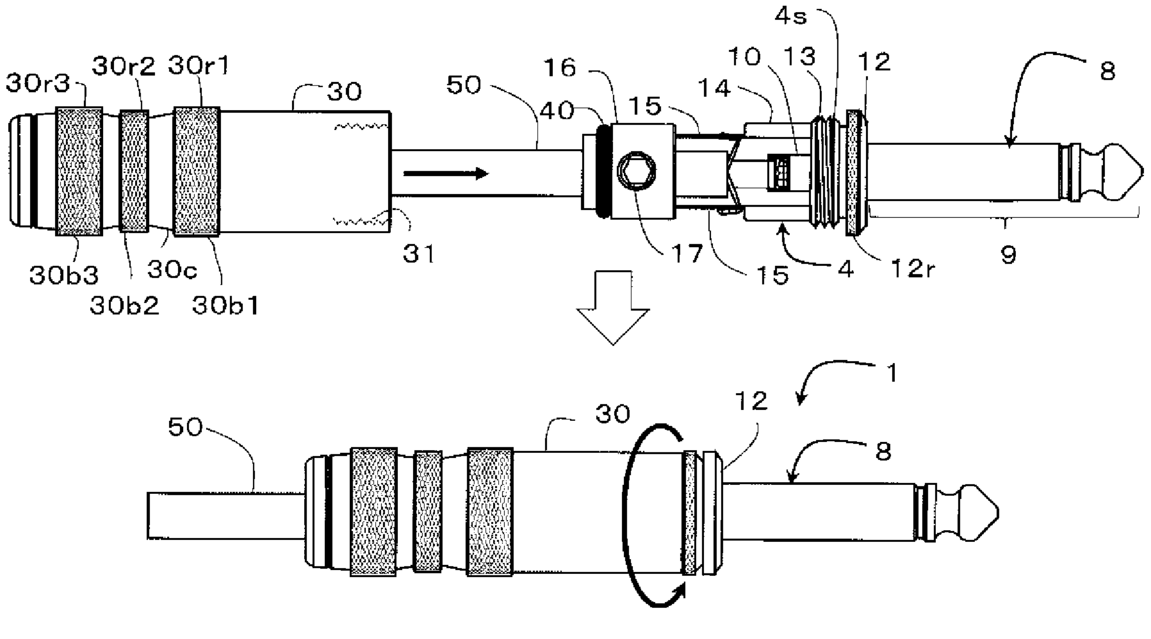
FIG. 9 is a view showing a state in which the plug cover is attached to a cable with the plug for the electronic plucked string instrument.

A description will be in detail given below of a using method of the plug for electronic plucked string instrument 1 according to the present invention and operation and effect thereof. As shown in FIG. 9, the cable 50 is passed through the inner side of the plug cover 30, and the cable 50 is connected to the cable attachment portion 7 of the plug main body 8 so as to form the already described structure. The female thread portion 31 of the plug cover 30 is threadably mounted to the male thread portion 13 of the cable attachment portion 7 in the plug main body 8 under this state, and the front end surface of the plug cover 30 is screwed into the rear end surface of the flange 12 in such a manner as to be brought into contact with and stopped at the rear end surface.

FIG. 10 shows a deformation process which is generated in the elastic ring 40 when the plug cover 30 is attached to the plug main body 8.

Reference sign s1 denotes a screwing state when the cover side stepped surface 32*j* begins to come into contact with the elastic ring 40, and any deformation is not generated in the elastic ring 40. Reference sign s2 denotes a state in which the plug cover 30 screws at a distance td1 from the state of s1, and the elastic ring 40 generates the deformation corresponding to the screwing distance td1 mentioned above in the axial direction by the inclined cover side stepped surface 32*j*. In the drawing, a broken line shows an outer diameter of the elastic ring 40 before deformation. A gap g0 is formed between the front side inner peripheral surface 32*a* and the elastic ring 40. Therefore, a displacement swelling to a direction orthogonal to the axis (direction coming close to the front side inner peripheral surface 32*a*) is generated in the elastic ring 40.

Reference sign s3 denotes a state in which the screwing distance of the plug cover 30 is increased to td2 (at this time point, the front end surface 30*t* of the plug cover 30 is not in contact with the rear end surface 12*s* of the flange 12). In the elastic ring 40, the swelling deformation in the direction orthogonal to the axis is regulated by the front side inner peripheral surface 32*a*, and the elastic deformation margin makes progress toward an inside of the deformation absorption space A. The deformation margin of the elastic ring 40 makes progress toward an inside of the deformation absorption space A', however, the gap g2 connected to the rear side of the deformation absorption space A' is narrow and small and the resistance for allowing the deformation margin of the elastic ring 40 to move forward thereto is great. Therefore, the volume of the deformation absorption space A' is small and the filling operation is early finished in an initial stage. Accordingly, the subsequent deformation margin of the elastic ring 40 is going to be absorbed mainly by the deformation absorption space A. Further, in proportion as the progress of filling on the basis of the deformation toward the deformation absorption spaces A and A', the contact surface with the elastic ring 40 and the plug cover 30 or the attachment sleeve 16 is increased, and the volume area of the elastic ring 40 in which the deformation is constrained by the contact friction is then increased, so that the deformation resistance of the elastic ring 40 is increased. As a result, an increment of the axial force generated by the screw fastening is going to be enlarged in association with the increase of the deformation margin of the elastic ring 40.

Reference sign s4 denotes a state in which the front end surface 30*t* of the plug cover 30 begins to come into contact with the rear end surface 12*s* of the flange 12. The wire diameter of the elastic ring 40 is desirably defined so that the deformation margin of the elastic ring 40 in this stage fills the deformation absorption spaces A and A', in particular the deformation absorption area A in proper quantities (for example, equal to or more than 50% and equal to or less than 100%). Reference sign s5 denotes a state in which the front end surface 30*t* of the plug cover 30 further turns the plug cover 30 and additionally tightens after coming into contact with the rear end surface 12*s* of the flange 12. In the stage to s4, the axial force generated between the female thread 31 and the male thread 13 is backed up by the elastic return force of the elastic ring 40, and an axial force increasing rate corresponding to an angle of screw rotation is controlled by the elastic constant of the elastic polymer material constructing the elastic ring 40. However, in a rotation segment from s4 to s5, the axial force mentioned above is backed up by the elastic return force caused by the intermetallic fastening of the plug cover 30 and the flange 12 (and the female thread 31 and the male thread 13). Therefore, the axial force increasing rate corresponding to the angle of screw rotation is rapidly enlarged in such a manner as to be controlled by Young's modulus of the metal.

Figure 11:
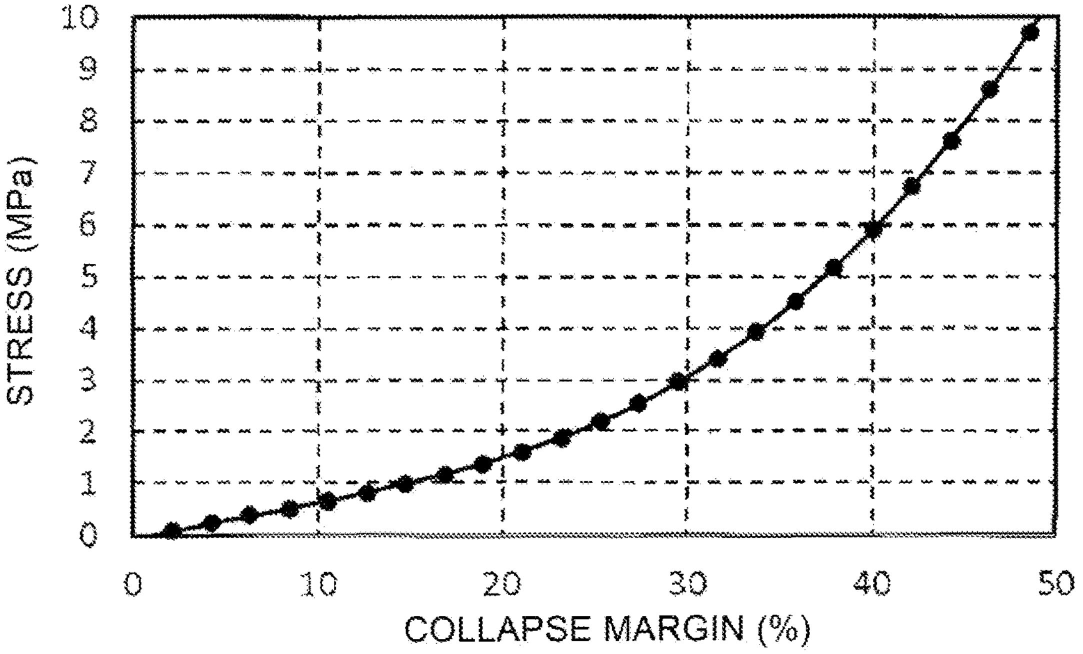
FIG. 11 is a graph showing a relationship between a collapse margin of the elastic ring in an axial direction and a generated elastic stress.
Figure 12:
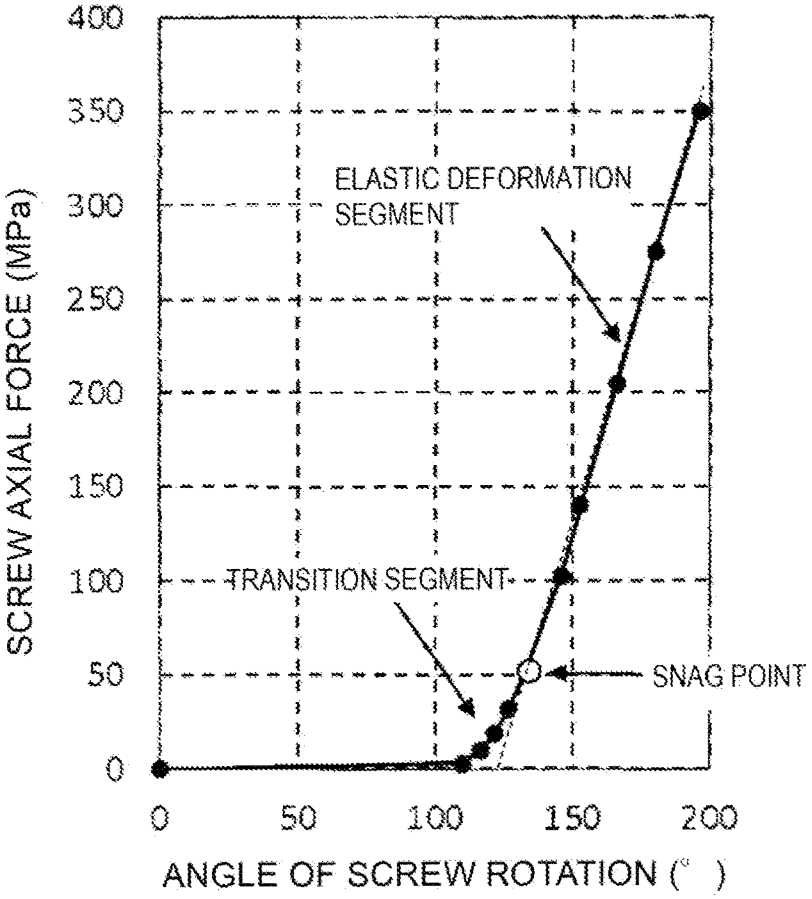
FIG. 12 is a graph showing a relationship between an angle of screw rotation and a screw axial force

FIG. 11 is a graph showing a relationship between the collapse margin of the elastic ring 40 in the axial direction and a generated elastic stress. The elastic stress linearly increased approximately until the value (0.2=20%) of the collapse margin employed in the present embodiment, and a level thereof remains in a value between 1 and several MPa. In the meantime, FIG. 12 is a graph showing a relationship between the angle of screw rotation and the screw axial force on the assumption of the intermetallic fastening. As shown in FIG. 7, a backlash generally exists between the female thread 31 and the male thread 13, and the screw axial force is not almost increased in spite of the increase of the angle of screw rotation until the backlash is filled even if the plug cover 30 comes into contact with the flange 12. Further, the intermetallic fastening state is going to make progress after the backlash is filled, and the screw axial force begins to be increased. In a case where a finished surface of each of the contact surfaces between the plug cover 30 and the flange 12, and between the female thread 31 and the male thread 13 is s cutting surface generated by a lathe, a transition segment is generated in an initial stage of an increase in the angle of screw, the transition segment being controlled by a deformation behavior of the metal surface layer portion such as a pressure contact collapse of processed concavity and convexity. The increase of the screw axial force in the transition segment is comparatively slow. Further, the transition segment is finished when the close attachment of the intermetallic fastening reaches a sufficient level, and an elastic deformation segment of a metal bulk is achieved. In this segment, the screw axial force is linearly and rapidly increased only a little increase of the angle of rotation due to gradient according to Young's modulus. A start point of the elastic deformation segment is called as a snag point. Even in the transition segment, it is known that the screw axial force obtained by a little increase about 10 degrees of the angle of rotation reaches fifth to tenth of the stress generated by the elastic ring 40 in the collapse margin 20% shown in FIG. 11.

Figure 13:
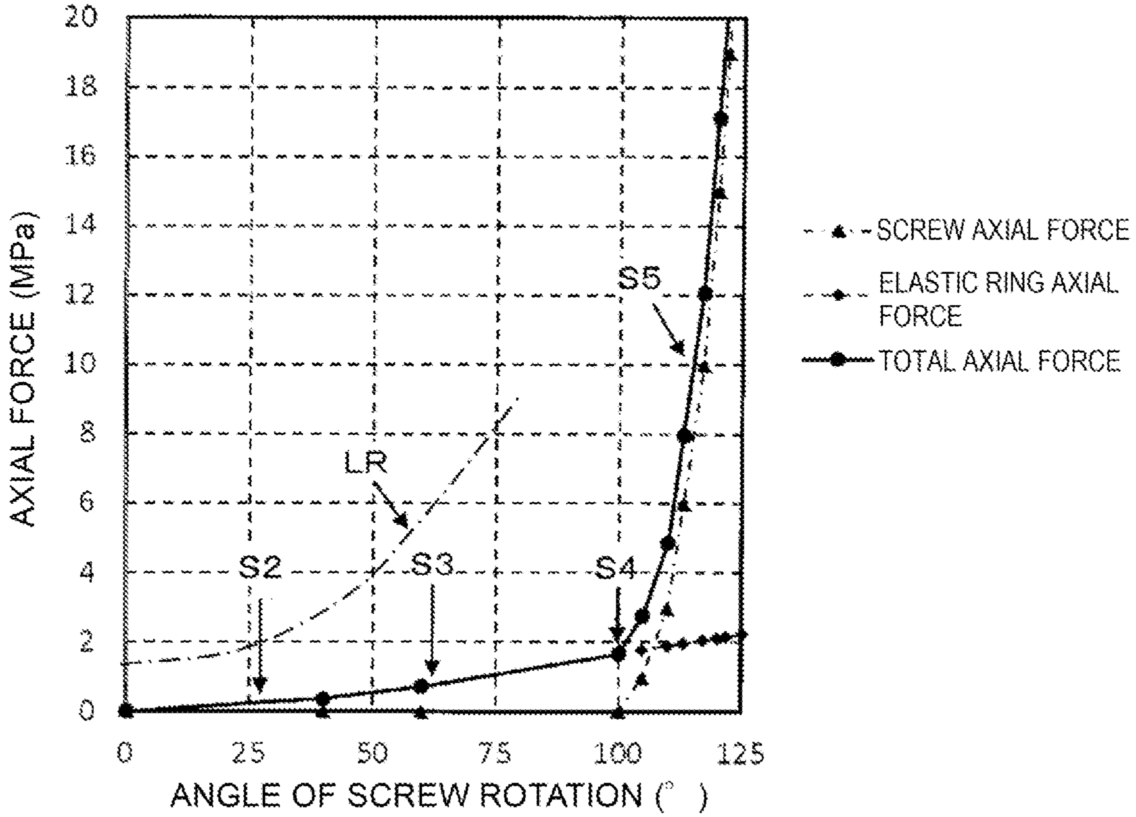
FIG. 13 is a graph showing a relationship between an angle of screw rotation of the plug cover, and an axial force, a screw axial force and a total axial force generated in the elastic ring in the plug for the electronic plucked string instrument in FIG. 2.

FIG. 13 shows a graph obtained by simulating a relationship between the angle of screw rotation of the plug cover 30, and the axial force (rhomboid marker and broken line), the screw axial force (triangular maker and single-dot chain line) and the total axial force (circular marker and solid line) generated in the elastic ring 40, for the plug for the electronic plucked string instrument 1 according to the present invention in FIG. 2 on the basis of the data in FIGS. 11 and 12. The axial force generated in the elastic ring 40 is dominant in the process of s2 to s4 in FIG. 10, and the axial force less than 2 MPa is generated at a time point reaching s4. This value is too small for solely preventing the slack of the screw, however, is important in the viewpoint of applying the bias axial force which is never generated in a case of no assistance of the elastic ring 40, that is, in a case of the fastening only by the screw (single-dot chain line in FIG. 13) to the screw fastening. Further, it goes into the transition segment from s4 to s5 which is backed up by the elastic return force caused by the intermetallic fastening, and the axial force of the screw fastening is increased to several times or more of the bias axial force, and a firm fastening state is formed.

The plug cover 30 is manually tightened into the plug main body 8, and it is hard to enhance the manual tightening to the axial force (about 50 MPa) corresponding to the snag point in FIG. 12. On the contrary, in a case where the fastening beyond the snag point is performed by using a tool, the slack is hard to be generated, but is hard to be loosened without any tool. Therefore, in the present embodiment, each of the dimensions of the portions is adjusted so that the screw fastening state is within the transition segment by the manual tightening.

An advantage achieved by the structure mentioned above is as follows. More specifically, the screwing force of the plug cover 30 for the cable attachment portion 7 is received by the metal-to-metal contact between the plug cover 30 and the flange 12. Therefore, the fastening axial force controlled by the elastic constant (Young's modulus) of the metal is generated between the contact screw threads. Since Young's modulus of the metal is significantly greater than the elastic constant of the elastic polymer material, the strong screw fastening state can be formed between the plug cover 30 and the cable attachment portion 7 even by the manual tightening. However, on the assumption of the manual tightening which can not be additionally tightened sufficiently, the screw fastening force is rapidly lost even by a small amount of rotation as is apparent from the segment from s5 to s4 of the screw axial force curve (single-dot chain line) in FIG. 13 when the plug cover 30 is rotated with respect to the cable attachment portion 7 in a reverse direction due to the impact force, thereby causing the slack of the plug cover 30.

However, in the plug for the electronic plucked string instrument 1, the elastic ring 40 is disposed between the plug cover 30 and the cable attachment portion 7, and the front end surface of the plug cover 30 is brought into contact with and stopped at the rear end surface of the flange 12 while the elastic ring 40 being compressed in the axial direction between the main body side ring support portion **16*j*** and the cover side ring support portion. Therefore, it is possible to effectively prevent the strong screw fastening state from being slacked due to the impact force applied from the external portion for the following reasons, the strong screw fastening state generated in association with the contact and stop between the metals.

*As is apparent from the comparison between the screw axial force curve (single-dot chain line) and the total axial force curve (solid line) in FIG. 13, the axial force caused by the return force of the compression deformed elastic ring 40 is superimposed on the axial force of the intermetallic fastening caused by the regulation of the screwing of the plug cover 30 due to the contact and stop, so that the stronger screw fastening state is formed.

*The friction force blocking the rotation of the plug cover 30 in a slacking direction is generated in the contact surface between the elastic ring installation portion **16*g*, the main body side ring support portion 16*j* and the cover side ring support portion, and the elastic ring 40 in association with the axial force caused by the return force of the elastic ring 40, and the return of the plug cover 30** in the slacking direction is inhibited.

*The impact force applied to the plug cover 30 is absorbed and reduced by the elastic ring 40.

Therefore, a sufficient screw fastening force can be generated between the plug main body 8 and the plug cover 30 by manual tightening, and it can be said that there is realized the plug for the electronic plucked string instrument 1 in which the screw fastening state of the plug cover 30 is hard to be slacked even if the external force is repeatedly applied to the cable 50.

In a case where the wire diameter of the elastic ring 40 is too large, the plug cover 30 is hard to be brought into contact with and stopped at the flange 12. As shown by a curve LR in FIG. 13, when the compression deformation of the elastic ring 40 makes progress, the deformation absorption spaces A and A' in FIG. 7 are full filled before the plug cover 30 comes into contact with the flange 12. The elastic ring 40 becomes almost hermetically sealed by the deformation absorption spaces A and A' at this time point, and the axial force increasing rate is greatly increased in a stage that the amount of screw rotation is small. Therefore, the plug cover 30 can not be manually tightened until coming into contact with the flange 12. If the plug cover 30 is not brought into contact with and stopped at the flange 12, the screw fastening state is insufficient as referring to the patent literatures 1 and 2, and can not contribute to the slack prevention of the plug cover 30. Further, in a case where the plug cover 30 is brought into contact with and stopped at the flange 12 by force, the biting of the elastic ring 40 into the gaps g1 and g2 in FIG. 7 is unavoidable.

Further, it is possible to employ such a structure that the cover side stepped surface **32*j* is orthogonal to the axial direction in FIG. 2, however, a component force pressing the elastic ring 40 to the elastic ring installation portion 16*g* side is not generated until the elastic ring 40 collapses in the axial direction and the deformation generated in the direction orthogonal to the axis is constrained by the inner surface of the plug cover 30 or the outer surface of the cable attachment portion 7. However, in a case where the cover side stepped surface 32*j* is inclined as shown in FIG. 7, a component force PF pressing the elastic ring 40 to the elastic ring installation portion 16*g* side is necessarily increased without the constraint as mentioned above. Therefore, the friction force generated in the contact surface with the elastic ring installation portion 16*g* is increased, and the rotation of the plug cover 30 in the slacking direction is more significantly blocked. 1. Further, it is hard to generate the problem that the elastic ring 40 bites into the narrow gaps g1 and g2 between the plug cover 30 and the cable attachment portion 7 which are generated in the vicinity of the elastic ring 40 in the axial direction due to the incline of the cover side stepped surface 32*j*. When the elastic ring comes to a state in which the elastic ring is pressed against the inner surface of the plug cover 30 or the outer surface of the cable attachment portion 7 while being compression deformed with a fixed or more stress, a slip displacement for the contact surface is constrained by the friction force. As a result, the elastic ring comes to a dead material portion having a high rigidity in a portion having a fixed depth from the contact surface. In a case where the cover side stepped surface 32*j* is inclined, the component force PF pressing to the elastic ring installation portion 16*g* side is increased, and the dead material portion formed in the contact surface side with the elastic ring installation portion 16*g* is enlarged. An elastic deformation area which is going to flow into the gaps g1 and g2 is reduced as a result of the increase of the dead material portion. This reduction of the elastic deformation area is presumed to be a factor for making it hard to generate the biting of the elastic ring 40. The increase of the dead material portion increases an apparent elastic constant of a whole of the elastic ring 40, thereby contributing to the increase of the threadably mount fastening force in a stage before the plug cap 30 is brought into contact with and stopped at the flange 12**.

Since the elastic ring installation portion **16*g* is formed into a groove shape as shown in FIG. 7, it is possible to employ the elastic ring 40 having a larger wire diameter while suppressing the enlargement in the inner diameter of the plug cover 30. Thus, it is possible to increase the deformation margin of the elastic ring 40 in a state in which the plug cover 30 is brought into contact with and stopped at the flange 12. Further, the contact surface of the elastic ring 40 with the elastic ring installation portion 16*g* is increased by employing the groove-shaped elastic ring installation portion 16***g*. Therefore, it is possible to further significantly obtain the effect of blocking the rotation of the plug cover 30 in the slacking direction, and then obtain the effect of preventing the plug cover 30 from slacking. The cross sectional shape of the elastic ring installation portion 16*g* can be formed into a rectangular shape in a simplified manner.

Further, it is possible to expand the deformation absorbing segment A to the outer peripheral edge side of the elastic ring 40 by the formation of the gap g0, and it is possible to more smoothly make progress the compression deformation in the axial direction of the elastic ring 40 contributing to the slack prevention of the plug cover 30. Further, the wire diameter of the elastic ring 40 is defined in such a manner that the radially inward compressed state is formed by the inner peripheral surface connecting to the front edge of the cover side stepped surface of the plug cover 30 before the front end surface of the plug cover 30 is brought into contact with and stopped at the rear end surface of the flange 12. Therefore, the following effect is generated. More specifically, the swelling deformation of the elastic ring 40 generated in the direction orthogonal to the axis makes progress until filling up the gap g0, and is thereafter constrained by the inner peripheral surface of the plug cover 30. Thus, the resistance for the deformation of the elastic ring 40 making progress to the surrounding deformation absorption spaces A and A' is increased, and the axial force associated with the screwing until the plug cover 30 is brought into contact with and stopped at the flange 12 is more significantly increased. This also contributes to the more significant effect of preventing the plug cover 30 from slacking.

Further, the portion positioned closer to the rear side than the male thread portion 13 of the cable attachment portion 7 forms a cantilever structure portion in which gaps in a radial direction are continuously formed in a peripheral direction with respect to the inner surface of the plug cover 30 by setting a threadably mount fastening portion to the female thread portion 31 of the plug cover 30 to a base end. Specifically, the connecting conductor 14 and the attachment sleeve 16 form the cantilever structure portion. In the cantilever structure portion as mentioned above, a rear end side thereof is in a so-called floating state via a gap in a radial direction in the inner side of the plug cover 30. Therefore, as shown in FIG. 9, when the tension or the torsion load is applied to the attached cable 50, a bending load in a cantilever mode is repeatedly applied to the threadably mount fastening portion in the base end. The bending load generates a rattle in the threadably mount fastening portion, and comes to a great factor for the slack of the plug cap 30.

In the structure in FIG. 2, the elastic ring installation portion 16*g* and the elastic ring 40 are disposed in the attachment sleeve 16, that is, in a rear end side of the cantilever structure portion in the direction of the axis O. According to the structure mentioned above, the bending displacement in the rear end side of the cantilever structure portion can be suppressed by the deformation resistance of the elastic ring 40 in a case where the tension or the torsion load is applied to the cable in FIG. 9. Further, the applied impact load can be reduced by the elastic ring 40, and it is possible to extremely enhance the effect of suppressing the rattle of the threadably mount fastening portion, and then suppressing the slack of the plug cap 30. In the present embodiment, the connecting conductor 14 is formed into a semi-tubular shape which is open in one side with respect to the axis O of the plug 1, and has a smaller axial cross sectional area than the attachment sleeve. Therefore, a flexural rigidity of the cantilever structure portion becomes smaller at a position of the connecting conductor 14. More specifically, the bending displacement of the cantilever structure portion becomes larger even in a case where the load applied to the cable 50 is comparatively small. As mentioned above, the effect of preventing the plug cover 30 from slacking is further significant by the provision of the elastic ring installation portion 16*g* and the elastic ring 40 in the attachment sleeve 16.

In a case where the elastic ring installation portion 16*g* is formed in the stem portion 4*s*, it is necessary to threadably mount the stem portion 4*s* in which the male thread portion 13 is formed to the female thread portion 31 in the plug cover 30 side. In connection with this structure, the outer diameter of the elastic ring installation portion 16*g* tends to be restricted by the nominal diameter of the male thread portion 13. Therefore, there is a problem that it is slightly hard to sufficiently secure the deformation absorption space of the elastic ring 40 which is formed in the outer peripheral edge side of the elastic ring 40. On the contrary, the attachment sleeve 16 in which the male thread portion 13 is not formed is not restricted. Therefore, the attachment sleeve 16 has an advantage that the deformation absorption spaces A and A' of the elastic ring 40 can be easily secured.

In FIG. 7, the rear end portion of the attachment sleeve 16 is formed as the reduced diameter portion 16*e*, and the gap g0 between the elastic ring installation portion 16*g* and the plug cover 30 can be expanded. As a result, the elastic ring 40 having a further larger wire diameter can be incorporated while securing the sufficient deformation absorption spaces A and A'. Thus, the effect of preventing the plug cover 30 from slacking is more significantly obtained. Further, since the deformation absorption spaces A and A' of the elastic ring 40 are sufficiently secured, it is possible to achieve an advantage that the problem of the biting of the elastic ring 40 into the gaps g1 and g2 between the plug cover 30 and the cable attachment portion 7 can be suppressed.

Next, it is important for forming a fastening structure which is harder to slack to instantaneously strongly apply a reverse torque to the plug main body 8 and the plug cover 30 when the plug cover 30 is manually tightened to the plug main body 8 (cable attachment portion 7). In the structure mentioned above, the plug cover 30 is brought into contact with and stopped at the flange 12. Therefore, the outer peripheral surface of the flange 12 is exposed to an outer side of the plug cover 30, and the knurled portion 4*r* can be engraved on an outer peripheral surface of the flange 12 in addition to the outer peripheral surface of the plug cover 30. Thus, it is possible to significantly obtain a slip stop effect when the plug cover 30 is manually tightened and screwed until the plug cover 30 is brought into contact with and stopped at the flange 12, and it is possible to easily achieve the instantaneous torque application by the manual tightening. In particular, the slip stop effect obtained by the formation of the knurled portions 4*r* and 30*r*1 to 30*r*3 is further significantly achieved by putting a cloth (or a hem of clothing) on the outer peripheral surface of the flange 12 and the outer peripheral surface of the plug cover 30 and tightening it. As a result, it is possible to enlarge an amount of additional tightening after the plug cover 30 comes into contact with the flange 12 in spite of the manual tightening, and it is possible to obtain the firm screw fastening state.

Further, in the plug cover 30 side, the valley portion 30*c* in the peripheral direction forms a finger contact portion when the plug cover 30 is screwed into the plug main body 8 as shown in FIG. 8. Further, the knurled portions 30*r*1 to

30*r*3 are engraved on the respective top surfaces of the first ribs 30*b*1 and 30*b*3 in both sides of the valley portion 30*c* and the second rib 30*b*2 of the valley bottom, and the top surface of the second rib 30*b*2 is offset from the top surfaces of the first ribs 30*b*1 and 30*b*3. Thus, a finger used for a screwing operation can be strongly gripped by three ribs and the knurled portions 30*r*1 to 30*r*3 in such a manner as to make a ball of finger follow an inner surface of the valley portion 30*c*, and it is possible to more effectively execute the additional tightening of the plug cover 30.

In the plug 1 according to the present embodiment, the following structure is further employed for retaining the cable 50. As shown in FIGS. 4 to 6, in the grounding metal fitting 4, a female thread hole 20 passing through a peripheral wall portion of the cylindrical attachment sleeve 16 in a radial direction is formed in the cylindrical attachment sleeve 16 which is connected to a rear and side of the connecting conductor 14, and the set screw 17 is screwed into the female thread hole 20. The set screw 17 protrudes to an inner side of the attachment sleeve 16 in a leading end side of a leg portion, and holds the cable 50 on the basis of a screwing compression force caused by screwing while clamping the cable 50 with respect to the peripheral wall portion of the attachment sleeve 16. The set screw 17 is constructed as a slotted set screw, a concave portion 17*a* is formed in an end surface in a side coming into contact with the cable 50, and a tool engagement hole 17*b* for engaging a tool such as a hexagonal wrench is formed in an end surface in an opposite site.

As shown in FIG. 6, the cable 50 is retained within the attachment sleeve 16 while being compressed and deformed into an approximately heart-shaped cross sectional form in such a manner that a concave portion 51*c* is generated at a contact position with the set screw 17. In particular, a leading end of the set screw 17 passes through the insulated outer sheath 51, and is electrically conducted and contacted with the shielded conductor layer 52. This contact is formed mechanically without being soldered. On the other hand, the biting of the leading end of the set screw 17 does not reach the intermediate insulation layer 54, and the insulation between the core wire 55 and the shielded conductor layers 52 and 53 is secured. Further, the insulated outer sheath 51 of the cable 50 partly bites into the concave portion 17*a* of the set screw 17.

Further, in an area where the cable 50 is in contact in an inner peripheral surface of the attachment sleeve 16, in an opposite side to the side with which the set screw 17 comes into contact, a biting convex portion 18 extending along a peripheral direction of the inner peripheral surface is integrally formed. The biting convex portion 18 receives the screwing compression force of the set screw 17 via the cable 50, and allows a part thereof to bite into the insulated outer sheath 51. Thus, even in a case where the stronger tensile force is applied to the cable 50, the slip displacement of the cable 50 against the inner surface of the attachment sleeve 16 is blocked by the biting convex portion 18, and it is possible to effectively suppress the slack of the set screw 17.

Figure 15:
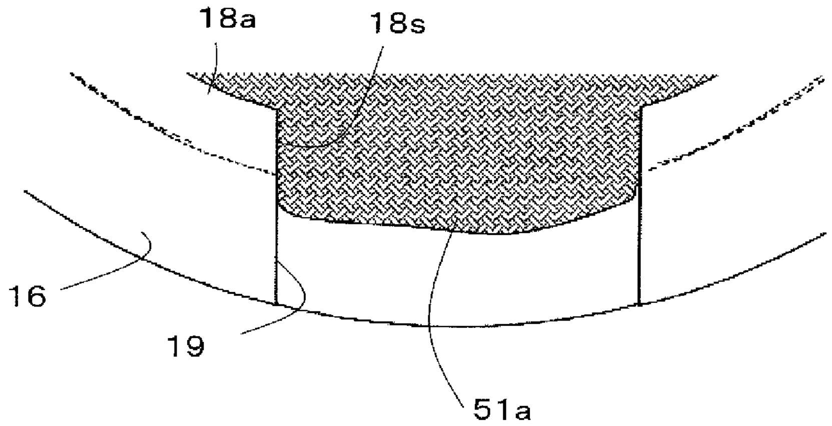
FIG. 15 is an enlarged front elevational cross sectional view showing an operation of a protruding streak portion and a notched concave portion.
Figure 16:
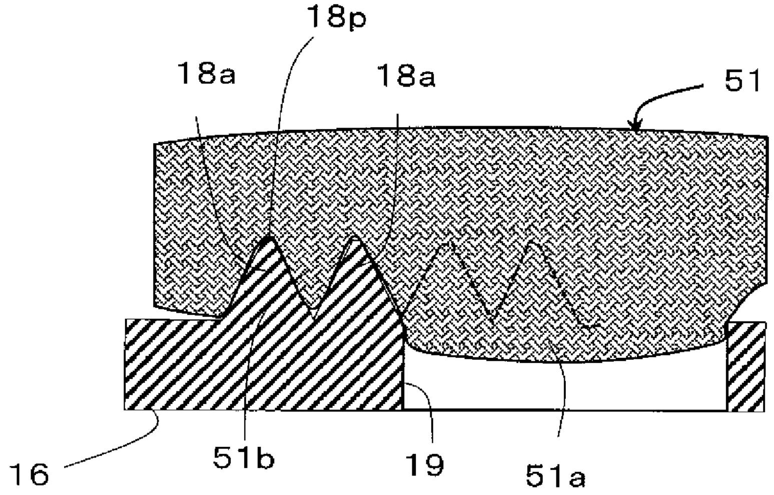
FIG. 16 is an enlarged side elevational cross sectional view showing an operation of the protruding streak portion and the notched concave portion.
Figure 17:
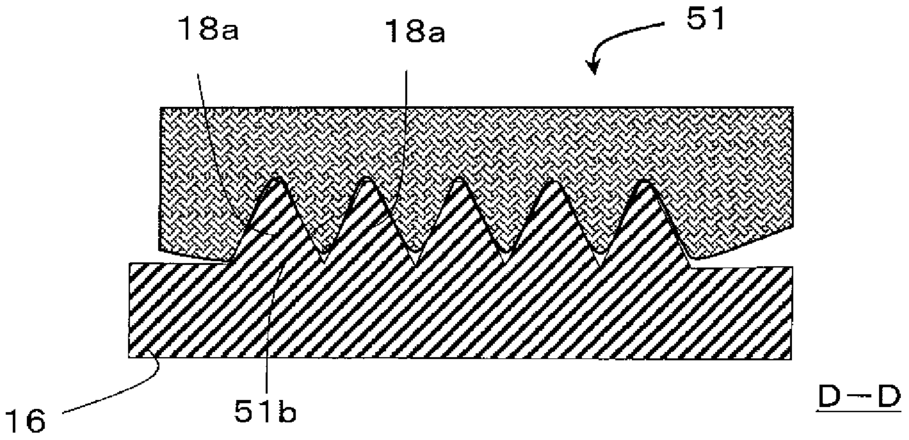
FIG. 17 is an explanatory view of an operation in a cross section along a line D-D in FIG. 6.

The biting convex portion formed on the inner peripheral surface of the attachment sleeve 16 is formed as a protruding streak portion 18*a* which is formed along the peripheral direction, as shown in FIGS. 15 to 17. Thus, the biting length of the biting convex portion 18 in the peripheral direction with respect to the insulated outer sheath 51 of the cable 50 is further enlarged, and it is possible to further enhance the effect of suppressing the slip displacement of the cable 50 with respect to the attachment sleeve 16. Further, since the biting force of the biting convex portion 18 with respect to the insulated outer sheath 51 is dispersed, the trouble that the biting convex portion 18 passes through the insulated outer sheath 51 is hard to be generated. A plural rows of protruding streak portions are formed in the inner peripheral surface along the axial direction of the attachment sleeve 16, and the effect mentioned above is accordingly enhanced more.

In a case where the strong torsional moment acts on the cable 50, the insulated outer sheath 51 of the cable 50 may slip and displace along the peripheral direction of the attachment sleeve 16, and the slack of the set screw 17 may be easily generated. In particular, in a case where the protruding streak portion (the biting convex portion 18) is formed over a whole circumference of the inner peripheral surface of the attachment sleeve 16 as mentioned above, the insulated outer sheath 51 of the cable 50 may slip and displace along the sleeve peripheral direction, that is, the longitudinal direction of the protruding streak portion when the strong torsional moment acts on the cable 50. Accordingly, in the present embodiment, the slip displacement stopping portion is effectively provided for inhibiting the protruding streak portion (the biting convex portion 18) from slipping and displacing relatively in the peripheral direction in a state in which it bites into the insulated outer sheath 51.

As shown in FIG. 15, the slip displacement stopping portion can be formed as the notched concave portion 19 which is formed by partly notching the protruding streak portion (the biting convex portion 18) at the intermediate position in the peripheral direction. As shown in the right of FIG. 3, the notched concave portion 19 can be formed, for example, as a long hole shaped through hole. As shown in FIGS. 15 and 16, the insulated outer sheath 51 of the cable 50 is pressed into the notched concave portion 19 outward in the radial direction, and an insulated outer sheath press-fit portion 51*a* is formed. In particular, as shown in FIG. 15, a notch end 18*s* of the protruding streak portion 18*a* comes into contact with the insulated outer sheath press-fit portion 51*a*, so that the relative slip displacement of the cable 50 in the peripheral direction with respect to the attachment sleeve 16 is effectively inhibited. As shown in FIG. 17, all of the plural rows of protruding streak portions 18*a* generates the biting with respect to the insulated outer sheath 51 in a region where the notched concave portion 19 is not formed in the inner peripheral surface of the attachment sleeve 16.

Figure 14:
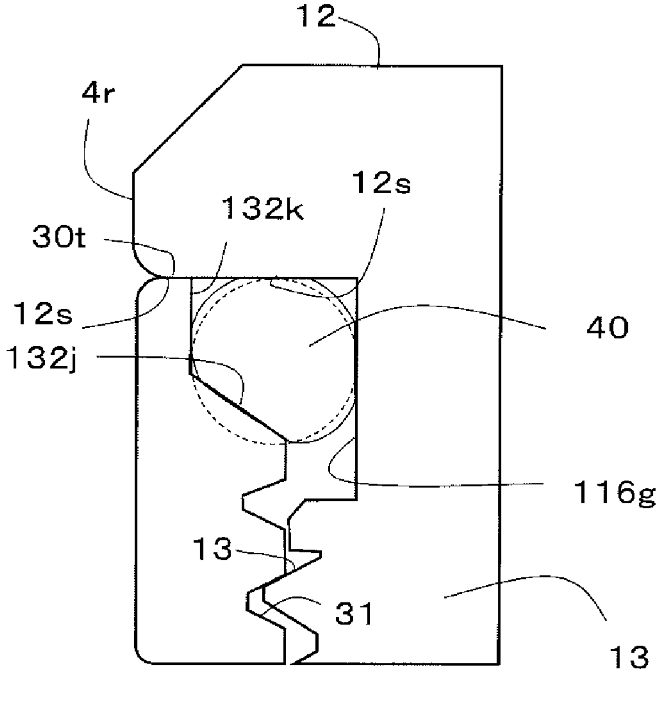
FIG. 14 is an enlarged front elevational cross sectional view showing a modified example in which an elastic ring installation portion is disposed in a stem portion.

The description is given above of the embodiments of the plug for the electronic plucked string instrument according to the present invention, however, the present invention is not limited to these embodiments. FIG. 14 shows an example in which an elastic ring installation portion 116*g* is formed at a base end position (position adjacent to the flange 12) of the male thread portion 13 which is formed in the stem portion 4*s*, and the rear end surface 12*s* of the flange 12 is also used as a main body side ring support portion. A counterbore 132*k* in a peripheral direction is formed in an inner peripheral surface of the plug cover 30 between a front side opening edge of the plug cover 30 and a front end edge of the female thread portion 31, and a bottom surface of the counterbore 132*k* is formed as a cap side stepped surface 132*j*. The elastic ring 40 installed to the elastic ring installation portion 116*g* is adapted to be compressed between the rear end surface 12*s* of the flange 12 and the cap side stepped surface 132*j*. A disposed aspect of the elastic ring installation portion and the elastic ring may be set to a combination of the structure disposed in the stem portion 4*s* in FIG. 14 and the structure disposed in the attachment sleeve 16 in FIG. 2, or may be set to the structure disposed in any one of them.

REFERENCE SIGNS LIST

1 plug for electronic plucked string instrument
3 main metal fitting
3*b* core wire insertion hole
3*c* engagement concave portion
3*f* terminal flange portion
3*t* leading end portion
4 grounding metal fitting
4*c* counterbore portion
4*r* knurled portion
4*s* stem portion
5 plug side insulation layer
5*f* insulation flange
6 insulating ring
7 cable attachment portion
8 plug main body
9 main terminal portion
10 terminal metal fitting
10*a* solder receiving portion
12 flange
12*e* reduced diameter portion
12*s* rear end surface
13 male thread portion
14 connecting conductor
15 soldered surface
16 attachment sleeve
16*e* reduced diameter portion
16*g* elastic ring installation portion
16*j* main body side ring support portion
16*m* main body portion
17 set screw
17*a* concave portion
17*b* tool engagement hole
18 biting convex portion
18*a* protruding streak portion
18*s* notch end
19 notched concave portion
20 female thread hole
30 plug cover
30*b*1, 30*b*3 first rib
30*b*2 second rib
30*c* valley portion
30*r*1-*r*3 knurled portion
30*t* front end surface
31 female thread portion
32*a* front side inner peripheral surface
32*b* rear side inner peripheral surface
32*j* cover side stepped surface
40 elastic ring
50 cable
51 insulated outer sheath
51*a* insulated outer sheath press-fit portion
51*c* concave portion
52, 53 shielded conductor layer
54 intermediate insulation layer
55 core wire
56-58 soldered portion
100 electric guitar
101 musical instrument side jack
110 amplifier
111 amplifier side jack
116*g* elastic ring installation portion
132*j* cap side stepped surface
132*k* counterbore
A, A' deformation absorption space
g0, g1, g2 gap

The invention claimed is:

1. A plug for an electronic plucked string instrument used by being attached to an end of a cable for connecting the cable to a jack of the electronic plucked string instrument or an amplifier, the plug comprising:

a metal plug main body including a main terminal portion shaped to engage with the jack, a flange integrated with a rear side of the main terminal portion when defining an insertion side of the main terminal portion to the jack in an axial direction of the main terminal portion as a front end side, and a cable attachment portion having a smaller diameter than the flange, integrated with a rear side of the flange, has a male thread portion formed in an outer peripheral surface thereof, and the end of the cable is attached thereto;

a metal plug cover formed into a tubular shape with both axial ends open, has a female thread portion formed on an inner peripheral surface threadably mounted to the male thread portion of the cable attachment portion, covers the cable attachment portion; and an elastic ring made of polymer elastic material and arranged in contact with an inner surface of the plug cover in an outer peripheral edge side thereof and an outer surface of the cable attachment portion in an inner peripheral edge side thereof respectively, wherein an elastic ring installation portion and a main body side ring support portion are formed in the plug main body, the elastic ring installation portion being formed on an outer peripheral surface of the cable attachment portion, the main body ring installation portion being formed with a larger diameter than the elastic ring installation portion in such a manner as to be adjacent to a front side of the elastic ring installation portion in an axial direction, and regulating the movement of the elastic ring installation portion to a front side of the elastic ring, and wherein a cover side ring support portion is formed in an inner surface of the plug cover, the cover side ring support portion extending inward in a radial direction with regard to an axis of the main terminal portion and coming into contact with a rear side outer surface of the elastic ring installed to the elastic ring installation portion, the elastic ring is compressed in an axial direction between the main body side ring support portion and the cover side ring support portion, and the front end surface of the plug cover is directly brought into contact with and stopped at the rear end surface of the flange.

2. The plug for the electronic plucked string instrument according to claim 1, wherein the cover side ring support portion is formed as a cover side stepped surface in which a front end edge side has a larger diameter than a rear end edge side in the axial direction, and the cover side stepped surface is formed as an inclined surface a diameter of which is reduced toward a rear side in the axial direction.

3. The plug for the electronic plucked string instrument according to claim 1, wherein the elastic ring installation portion is formed into such a groove shape that an outer peripheral edge of the elastic ring is offset from an inner surface of the plug cover to an inner side in a radial direction by accommodating an inner peripheral edge side of the elastic ring.

4. The plug for the electronic plucked string instrument according to claim 1, wherein an outer diameter of the elastic ring is defined so that a gap is generated with respect to an inner peripheral surface in the front end side of the cover side ring support portion of the plug cover in a non-compressed state.

5. The plug for the electronic plucked string instrument according to claim 4, wherein a wire diameter of the elastic ring is defined so that a radially inward compressed state is formed by an inner peripheral surface in the front end side of a cover side stepped surface of the plug cover before the front end surface of the plug cover is brought into contact with and stopped at a rear end surface of the flange.

6. The plug for the electronic plucked string instrument according to claim 5, wherein on the assumption that d is a wire diameter of the elastic ring, and Δd is a deformation margin of the elastic ring which is generated in a normal direction of the cover side stepped surface in the cover side ring support portion under a state in which the front end surface of the plug cover is brought into contact with and stopped at the rear end surface of the flange, a value of Δd/d is adjusted to be equal to or more than 0.1 and equal to or less than 0.3.

7. The plug for the electronic plucked string instrument according to claim 1, wherein a portion positioned closer to a rear side than the male thread portion of the cable attachment portion is formed as a cantilever structure portion in which gaps in a radial direction are continuously formed in a peripheral direction with respect to the inner surface of the plug cover by setting a threadably mount fastening portion to the female thread portion of the plug cover as a base end, and the elastic ring installation portion and the elastic ring are disposed in a rear end side of the cantilever structure portion in the axial direction.

8. The plug for the electronic plucked string instrument according to claim 1, wherein the cable attachment portion comprises a stem portion which is integrally formed adjacent to the rear side of the flange, and an attachment sleeve which is connected to the rear side of the stem portion via a connecting conductor, is formed into a tubular shape having both opened ends in the axial direction and is provided for allowing the cable to be inserted in the axial direction from a rear end side opening thereof, wherein the male thread portion is formed in an outer peripheral surface of the stem portion, and the female thread portion is formed in the front end portion of the inner surface of the plug cover, and wherein the elastic ring installation portion and the elastic ring are disposed in at least any one of the stem portion and the attachment sleeve.

9. The plug for the electronic plucked string instrument according to claim 8, wherein a portion positioned closer to a rear side than the male thread portion of the cable attachment portion is formed as a cantilever structure portion in which gaps in a radial direction are continuously formed in a peripheral direction with respect to the inner surface of the plug cover by setting a threadably mount fastening portion to the female thread portion of the plug cover as a base end, the elastic ring installation portion and the elastic ring are disposed in a rear end side of the cantilever structure portion in the axial direction, the connecting conductor has a smaller axial cross sectional area than the attachment sleeve and forms the cantilever structure portion together with the attachment sleeve, and the elastic ring installation portion and the elastic ring are disposed at least in the attachment sleeve.

10. The plug for the electronic plucked string instrument according to claim 9, wherein a rear end portion of the attachment sleeve in the axial direction is formed as a reduced diameter portion a diameter of which is reduced by a sleeve side stepped surface, the sleeve side stepped surface forms the main body side ring support portion, and an outer peripheral surface of the reduced diameter portion forms the elastic ring insulation portion.

11. The plug for the electronic plucked string instrument according to claim 1, wherein a knurled portion is engraved on both of an outer peripheral surface of the flange and an outer peripheral surface of the plug cover.

12. The plug for the electronic plucked string instrument according to claim 11, wherein a valley portion in a peripheral direction is formed at an intermediate position in the axial direction on the outer peripheral surface of the plug cover, a pair of circumferential first ribs are formed on the outer peripheral surface in such a manner as to be adjacent to both sides of the valley portion in the axial direction, a second rib is formed at a bottom position of the valley portion, a top surface of the second rib being positioned to be offset in a valley bottom direction from top surfaces of the first ribs, and the knurled portions are independently engraved on the top surfaces of the pair of first ribs and the top surface of the second rib.

13. A cable to which the plug for the electronic plucked string instrument according to claim 1 is attached.

* * * * *